US012292169B1

(12) United States Patent
Li et al.

(10) Patent No.: US 12,292,169 B1
(45) Date of Patent: May 6, 2025

(54) SHADOWLESS CONNECTOR

(71) Applicant: Wangs Alliance Corporation, Port Washington, NY (US)

(72) Inventors: Anmiao Li, Dongguan (CN); Feng Yu, Dongguan (CN); Aimin Ou, Dongguan (CN)

(73) Assignee: Wangs Alliance Corporation, Port Washington, NY (US)

(*) Notice: Subject to any disclaimer, the term of this patent is extended or adjusted under 35 U.S.C. 154(b) by 0 days.

(21) Appl. No.: 18/985,666

(22) Filed: Dec. 18, 2024

Related U.S. Application Data

(60) Provisional application No. 63/669,526, filed on Jul. 10, 2024.

(51) Int. Cl.

| | |
|---|---|
| ***F21S 4/24*** | (2016.01) |
| ***F21S 10/02*** | (2006.01) |
| ***F21V 21/005*** | (2006.01) |
| ***F21V 23/00*** | (2015.01) |
| ***F21Y 103/10*** | (2016.01) |

(Continued)

(52) U.S. Cl.
CPC ................ *F21S 4/24* (2016.01); *F21S 10/02* (2013.01); *F21V 21/005* (2013.01); *F21V 23/005* (2013.01); *F21V 23/007* (2013.01); *F21Y 2103/10* (2016.08); *F21Y 2103/20* (2016.08);
(Continued)

(58) Field of Classification Search
CPC ........ F21S 4/24; F21S 4/22; F21S 4/26; F21S 2/005; F21V 23/06; F21V 21/005; F21Y 2107/90
See application file for complete search history.

(56) References Cited

U.S. PATENT DOCUMENTS 5,463,280 A 10/1995 Johnson
6,013,988 A 1/2000 Bucks et al.
(Continued)

FOREIGN PATENT DOCUMENTS

CN 205979248 2/2017
CN 107427687 11/2019
(Continued)

OTHER PUBLICATIONS

InvisiLED® Outdoor RGBWW Wet Rated, Color changing and Adjustable CCT LED Tape, www.waclighting.com, May 2024.
(Continued)

*Primary Examiner* — William N Harris
(74) *Attorney, Agent, or Firm* — Weiss & Arons LLP

(57) ABSTRACT

Apparatus, methods and systems for light tape. The light tape may include a first segment. The light tape may include a first array of light emitting diodes ("LEDs"). The first array of LEDs may be disposed along the first segment. The first array of LEDs may emit light in a first direction. The light tape may include a second array of LEDs. The second array of LEDs may be disposed along the first segment. The second array of LEDs may emit light in a second direction. The light tape may include a first extension extending from the first segment. The first extension may be physically connected to a second extension extending from a second segment. The first extension may form a joint when connected to the second extension. The joint may include at least one LED disposed on each of the first extension and the second extension.

28 Claims, 11 Drawing Sheets

(51) Int. Cl.
*F21Y 103/20* (2016.01)
*F21Y 113/13* (2016.01)
*F21Y 115/10* (2016.01)

(52) U.S. Cl.
CPC ........ *F21Y 2113/13* (2016.08); *F21Y 2115/10* (2016.08)

(56) References Cited

U.S. PATENT DOCUMENTS

| | | | | |
|---|---|---|---|---|
| 6,147,458 | A | 11/2000 | Bucks et al. | |
| 6,149,283 | A | 11/2000 | Conway et al. | |
| 6,586,890 | B2 | 7/2003 | Min et al. | |
| 6,788,011 | B2 | 9/2004 | Mueller et al. | |
| 6,806,659 | B1 | 10/2004 | Mueller et al. | |
| 7,015,825 | B2 | 3/2006 | Callahan | |
| 7,038,399 | B2 | 5/2006 | Lys et al. | |
| 7,204,608 | B2 | 4/2007 | Beeman et al. | |
| 7,233,115 | B2 | 6/2007 | Lys | |
| 7,256,554 | B2 | 8/2007 | Lys | |
| 7,547,113 | B2 | 6/2009 | Lee | |
| 7,737,643 | B2 | 6/2010 | Lys | |
| 7,847,486 | B2 | 12/2010 | Ng | |
| 8,148,912 | B2 | 4/2012 | Kim | |
| 8,272,757 | B1 | 9/2012 | Fan et al. | |
| 8,598,793 | B2 | 12/2013 | Yan et al. | |
| 8,773,024 | B2 | 7/2014 | Yan et al. | |
| 8,810,141 | B2 | 8/2014 | Takeda et al. | |
| 8,926,145 | B2 | 1/2015 | Lynch et al. | |
| 9,204,519 | B2 | 12/2015 | Gan et al. | |
| 9,247,597 | B2 | 1/2016 | Miskin et al. | |
| 9,306,139 | B2 | 4/2016 | Lee et al. | |
| 9,609,711 | B2 | 3/2017 | Jiang et al. | |
| 9,644,828 | B1 | 5/2017 | May | |
| 9,681,512 | B1 | 6/2017 | Xiong | |
| 9,730,282 | B2 | 8/2017 | Munday et al. | |
| 10,094,547 | B2 | 10/2018 | Hierzer | |
| 10,143,048 | B2 | 11/2018 | Hierzer | |
| 10,154,551 | B2 | 12/2018 | Miskin et al. | |
| 10,180,218 | B2 | 1/2019 | Hierzer | |
| 10,234,091 | B1 | 3/2019 | Chaimberg et al. | |
| 10,299,321 | B1 | 5/2019 | Trask et al. | |
| 10,378,747 | B1 | 8/2019 | Hanslip | |
| 10,631,386 | B1 | 4/2020 | McRae | |
| 10,842,895 | B1 * | 11/2020 | Espina | A61L 2/10 |
| 10,939,523 | B2 | 3/2021 | Hanslip | |
| 10,941,930 | B2 | 3/2021 | Hatch et al. | |
| 11,486,553 | B1 | 11/2022 | Lavin et al. | |
| 11,796,161 | B2 | 10/2023 | Puvanakijjakorn | |
| 11,802,682 | B1 | 10/2023 | Choy et al. | |
| 11,812,532 | B2 | 11/2023 | Puvanakijjakorn | |
| 11,864,290 | B1 | 1/2024 | Puvanakijjakorn | |
| 11,906,114 | B2 | 2/2024 | Halliwell | |
| 2007/0019415 | A1 | 6/2007 | Leblanc et al. | |
| 2007/0273299 | A1 | 11/2007 | Miskin et al. | |
| 2008/0094828 | A1 | 4/2008 | Shao | |
| 2008/0203936 | A1 | 8/2008 | Mariyama et al. | |
| 2009/0009997 | A1 * | 1/2009 | Sanfilippo | H05B 47/18 362/244 |
| 2009/0021185 | A1 | 1/2009 | Ng | |
| 2009/0206762 | A1 | 8/2009 | Gibboney | |
| 2010/0259200 | A1 | 10/2010 | Beausoleil | |
| 2010/0271804 | A1 | 10/2010 | Levine | |
| 2011/0037407 | A1 | 2/2011 | Ahn et al. | |
| 2011/0121752 | A1 | 5/2011 | Newman, Jr. et al. | |
| 2012/0235582 | A1 | 9/2012 | Ido | |
| 2013/0063035 | A1 | 3/2013 | Baddela | |
| 2013/0127356 | A1 | 5/2013 | Tanaka et al. | |
| 2013/0162150 | A1 | 6/2013 | Masuda | |
| 2013/0215610 | A1 * | 8/2013 | Tsai | F21K 9/00 362/225 |
| 2013/0249437 | A1 | 9/2013 | Wang et al. | |
| 2013/0279179 | A1 | 10/2013 | Pearson et al. | |
| 2014/0133149 | A1 | 5/2014 | Catalano et al. | |
| 2014/0239841 | A1 | 8/2014 | Gilman et al. | |
| 2014/0300285 | A1 | 10/2014 | Medak | |
| 2014/0361697 | A1 | 12/2014 | Miskin et al. | |
| 2014/0362566 | A1 | 12/2014 | Tischler et al. | |
| 2015/0022114 | A1 | 1/2015 | Kim | |
| 2015/0028776 | A1 | 1/2015 | McMillan | |
| 2015/0077991 | A1 | 3/2015 | Palfreyman et al. | |
| 2015/0115823 | A1 | 4/2015 | Serra | |
| 2016/0091147 | A1 | 3/2016 | Jiang et al. | |
| 2016/0174325 | A1 | 6/2016 | Monjo | |
| 2016/0178173 | A1 | 6/2016 | Yadav et al. | |
| 2016/0363267 | A1 | 12/2016 | Jiang et al. | |
| 2016/0366746 | A1 | 12/2016 | Van de Ven et al. | |
| 2017/0011670 | A1 | 1/2017 | Van de Ven et al. | |
| 2017/0064790 | A1 | 3/2017 | Clark et al. | |
| 2017/0130941 | A1 | 5/2017 | Ford | |
| 2017/0171929 | A1 | 6/2017 | Erdener et al. | |
| 2017/0171932 | A1 | 6/2017 | Puvanakijjakorn | |
| 2017/0265260 | A1 | 9/2017 | Briggs et al. | |
| 2017/0374718 | A1 | 12/2017 | Fang et al. | |
| 2018/0031184 | A1 | 2/2018 | Mngchun | |
| 2018/0070419 | A1 | 3/2018 | Girard et al. | |
| 2018/0376555 | A1 | 12/2018 | Wang | |
| 2019/0045593 | A1 | 2/2019 | Miskin et al. | |
| 2019/0098723 | A1 | 3/2019 | Sadwick et al. | |
| 2019/0211983 | A1 | 7/2019 | Shine et al. | |
| 2019/0293270 | A1 * | 9/2019 | Ansems | F21S 4/28 |
| 2019/0320515 | A1 | 10/2019 | Sadwick | |
| 2020/0389955 | A1 | 12/2020 | Price et al. | |
| 2021/0123571 | A1 | 4/2021 | Cisneros et al. | |
| 2021/0136886 | A1 | 5/2021 | Reed | |
| 2022/0053617 | A1 | 2/2022 | Zhang et al. | |
| 2022/0201820 | A1 | 6/2022 | Kumar et al. | |
| 2023/0235860 | A1 | 7/2023 | Halliwell | |

FOREIGN PATENT DOCUMENTS

| | | | |
|---|---|---|---|
| DE | 102014206434 | 10/2015 | |
| EP | 2730834 A1 * | 5/2014 | F21S 2/005 |
| JP | WO2011/065047 | 6/2011 | |
| JP | 2011165394 | 8/2011 | |
| JP | 2013254665 | 12/2013 | |
| KR | 1020120135003 | 12/2012 | |
| RU | 2358354 | 12/2008 | |
| WO | WO1999/007187 | 2/1999 | |
| WO | WO00/02421 | 1/2000 | |
| WO | WO2011143510 | 11/2011 | |
| WO | WO2014108870 | 7/2014 | |
| WO | WO2015/041530 | 3/2015 | |

OTHER PUBLICATIONS

InvisiLED® Outdoor Pro+ Wet Rated LED Tape, www.waclighting.com, Dec. 2023.

12VAC Landscape Outdoor Tape Wet Rated LED Tape, www.waclighting.com, May 2024.

"Low Drop Fixed and Adjustable Positive Voltage Regulators," Unisonic Technologies Co., LTD, Nov. 14, 2016.

Idriver ID2006 Data Sheet, Oct. 2019. (Partial English language machine translation attached hereto.).

"ME32S003AF6P7 Data Sheet," www.mesilicon.com, Nov. 27, 2019. (Partial English language machine translation attached hereto.).

* cited by examiner

SHADOWLESS CONNECTOR

CROSS-REFERENCE TO RELATED APPLICATIONS

This application is a nonprovisional of U.S. Provisional Application No. 63,669,526, filed Jul. 10, 2024, which is hereby incorporated by reference herein in its entirety.

BACKGROUND

Typical elongated lighting apparatus that are connectable for creating a chain of lighting segments use mechanical connectors that disrupt continuity of lighting along the length of the chain.

It would therefore be desirable to provide apparatus and methods for providing a chain or lighting segments without disruption of lighting.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

Figure 1:
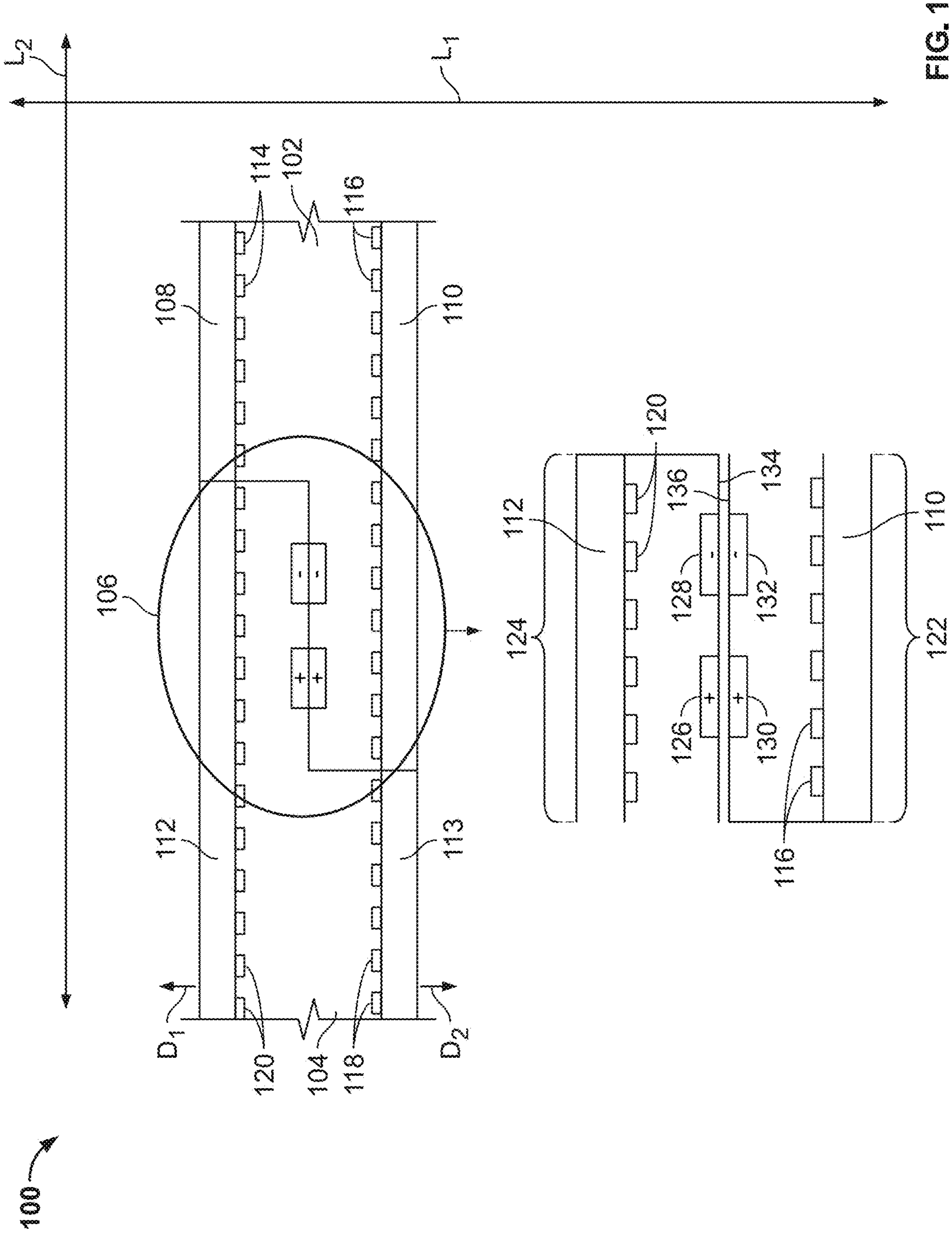
FIG. 1 shows schematically illustrative apparatus in accordance with the principles of the invention.

The leftmost digit (e.g., "L") of a three-digit reference numeral (e.g., "LRR"), and the two leftmost digits (e.g., "LL") of a four-digit reference numeral (e.g., "LLRR"), generally identify the first figure in which a part is called-out.

DETAILED DESCRIPTION

Apparatus and methods for providing a light tape is provided.

The light tape may include a first segment. The light tape may include a second segment. The first segment may include a first side. The first segment may include a second side. The second side may be different from the first side. The second side may be opposite the first side.

The first segment may include a first array of light emitting diodes ("LEDs"). The first array of LEDs may be disposed along the first segment. The first array of LEDs may be disposed along the first side of the first segment. The first array of LEDs may emit light in a first direction. The first array of LEDs may include two or more LEDs. The two or more LEDs may be connected in parallel, in series, or any combination of serial and parallel connections.

The first segment may include a second array of LEDs. The second array of LEDs may be disposed along the first segment. The second array of LEDs may be disposed along the second side of the first segment. The second array of LEDs may emit light in a second direction. The second direction may be different from the first direction. The second direction may be opposite the first direction. The second array of LEDs may include two or more LEDs. The two or more LEDs may be connected in parallel, in series, or any combination of serial and parallel connections.

The first segment may include a first extension. The first extension may extend from the first segment.

The first extension may be connected to a second extension. The first extension may be physically connected to the second extension. The second extension may extend from the second segment. The second segment may have one or more characteristics in common with the first segment. When the first extension is connected to the second extension, the first extension and the second extension may form a joint.

The joint may include at least one LED disposed on the first extension and at least one LED disposed on the second extension. The at least one LED disposed on the first extension may be included in the first array of LEDs. The at least one LED disposed on the first extension may be an LED that is not included in the second array of LEDs. The at least one LED disposed on the second extension may be included in the second array of LEDs. The at least one LED disposed on the second extension may not be included in the first array of LEDs.

Physical connection of the first extension and the second extension may include an electrical connection. Physical connection of the first extension and the second extension may include a mechanical connection. Physical connection of the first extension and the second extension may include a magnetic connection. Physical connection of the first extension and the second extension may include any other suitable connection.

The electrical connection may not fasten the first extension to the second extension. The electrical connection may fasten the first extension to the second extension. The electrical connection may fasten the first extension to the second extension. The first extension may include first electrical contacts. The first electrical contacts may include one or more positive electrical contacts and one or more negative electrical contacts. The second extension may include second electrical contacts. The second electrical contacts may include one or more positive electrical contacts and one or more negative contacts. The first extension may electrically connect to the second extension via the first and second electrical contacts.

Electrical contacts may include pins, wires or any other suitable conductive material.

The first extension may define a first face. The first electrical contacts may not extend beyond the first face. The at least one LED disposed on the first extension may be disposed on a back side of the first face. The second extension may define a second face. The second electrical contacts may not extend beyond the second face. The at least one LED disposed on the second extension may be disposed on a back side of the second face. When the first extension is connected to the second extension, the first face may be in contact with the second face. When the first face is in contact with the second face, the first electrical contacts may be in contact with the second electrical contacts. When the first electrical contacts are in contact with the second electrical contacts, electricity may be conducted from the first segment to the second segment via the first and second electrical contacts.

The first segment and the second segments may extend along a longitudinal axis. Electricity may be conducted from the first segment to the second segment, in a direction that is transverse to the longitudinal axis.

The mechanical connection may include any suitable mechanical connection. The mechanical connection may not conduct electricity from the first segment to the second segment. The mechanical connection may conduct electricity from the first segment to the second segment.

The first extension may be connected to the second extension via a weld. The weld may be a plastic weld, a chemical weld, an ultrasonic weld, a fusion weld, or any other suitable weld. The first extension may be connected to the second extension via a magnet. The magnet may include a permanent magnet, an electromagnet, a temporary magnet, ferromagnetic material, paramagnetic material, diamagnetic material or any other suitable magnet or magnetic material. The first extension may be connected to the second extension via an adhesive. The adhesive may include glue, tape, epoxy adhesives, polyurethane adhesives, acrylic adhesives, hot melt adhesives or any other suitable adhesives. The first extension may be connected to the second extension via any suitable connection.

The first segment may include a printed circuit board ("PCB"). The first array of LEDs may be disposed on a first side of the PCB. The second array of LEDs may be disposed on a second side of the PCB. The first side of the PCB may be opposite the second side of the PCB.

The PCB may be a first PCB. When the PCB is a first PCB, the first segment may include a second PCB. The first array of LEDs may be disposed on the first PCB. The second array of LEDs may be disposed on the second PCB. The first PCB may be disposed opposite the second PCB. The first PCB may be disposed back-to-back with the second PCB.

The first array of LEDs may include first correlated color temperature ("CCT") LEDs. The first array of LEDs may include second CCT LEDs. The second array of LEDs may include first CCT LEDs. The second array of LEDs may include second CCT LEDs.

Table 1 lists illustrative ranges that may include nominal CCT values for the first CCT LEDs and the second CCT LEDs.

TABLE 1

Illustrative ranges that may include nominal CCT values for the first and second CCT LEDs.

| Illustrative range endpoints (° K) | | | |
|---|---|---|---|
| Lower | Upper | Lower | Upper |
| <1800 | 1800 | 3400 | 3500 |
| 1800 | 1900 | 3500 | 3600 |
| 1900 | 2000 | 3600 | 3700 |

TABLE 1-continued

Illustrative ranges that may include nominal CCT values for the first and second CCT LEDs.

| Illustrative range endpoints (° K) | | | |
|---|---|---|---|
| Lower | Upper | Lower | Upper |
| 2000 | 2100 | 3700 | 3800 |
| 2100 | 2200 | 3800 | 3900 |
| 2200 | 2300 | 3900 | 4000 |
| 2300 | 2400 | 4000 | 4100 |
| 2400 | 2500 | 4100 | 4200 |
| 2500 | 2600 | 4200 | 4300 |
| 2600 | 2700 | 4300 | 4400 |
| 2700 | 2800 | 4400 | 4500 |
| 2800 | 2900 | 4500 | 4600 |
| 2900 | 3000 | 4600 | 4700 |
| 3000 | 3100 | 4700 | 4800 |
| 3100 | 3200 | 4800 | 4900 |
| 3200 | 3300 | 4900 | 5000 |
| 3300 | 3400 | 5000 | >5000 |
| Other suitable lower endpoints | Other suitable upper endpoints | Other suitable lower endpoints | Other suitable upper endpoints |

The first segment may be included in a string of segments. The string of segments may include the first segment, the second segment, a third segment, a fourth segment and any other suitable segment. The first segment may be connected to the second segment at a first joint. The second segment may be connected to the third segment at a second joint. The third segment may be connected to the fourth segment at a third joint. Each segment may be connected to another segment at a corresponding joint. Each joint may include a first extension and a second extension. Each segment may include a first extension and a second extension. Each joint may include a first extension of one segment and a second extension of another segment.

The first segment may include a first output pole. The first output pole may be a positive electrical contact. The first output pole may be a positive electrical contact disposed on a second extension of the first segment. The first segment may include a second output pole. The second output pole may be a negative electrical contact. The second output pole may be a negative pole disposed on the second extension of the first segment. The first segment may receive power via a first conductor connected to the first output pole. The first conductor may be included in a first wire. The first segment may receive power via a second conductor connected to the second output pole. The second conductor may be included in a second wire.

The first and second conductor may include copper. The first and second conductor may include aluminum. The first and second conductor may include any suitable conducting material.

The first segment may receive power only via the first wire and the second wire. The first and second wires may be soldered to the first and second output poles. The first and second wires may be connected to the first and second output poles via any suitable connection. The first and second wires may apply voltage to the first output pole and the second output pole.

The first segment may be in electronic communication with a selector. The first segment may be in electronic communication with the selector via the first and second wires. The selector may be used to select a mixed CCT from a plurality of CCT states. The plurality of CCT states may include any suitable combination of the first CCT and the second CCT. The plurality of CCT states may include a plurality of preset or user selectable CCTs. The combination may include 100% of the first CCT and 0% of the second CCT. The combination may include 0% of the first CCT and 100% of the second CCT. The combination may include any suitable percentage of the first CCT and any suitable percentage of the second CCT.

The selector may be a manual selector. The selector may include a switch. The selector may include a dial. The selector may include a slider. The selector may include a button. The selector may include an electronic selector. The selector may include digital user interface. The selector may include a touchpad. The selector may include a wireless sensor. The selector may include a remote-controlled sensor. The selector may include a wired selector. The selector may include any other suitable selector.

The selector may be used to select between three CCT states. The selector may be used to select between five CCT states. The selector may be used to select between any suitable number of CCT states. The selector may be used to select from a continuous range of mixed CCTs between the first CCT and the second CCT. The selector may be used to select from a continuous range of mixed CCTs between the first CCT and the second CCT including the first CCT and the second CCT.

The first segment may be in electronic communication with a controller circuit. The controller circuit may include a microcontroller. The controller circuit may include any other suitable controller. The controller circuit may be in electronic communication with the selector. The first segment may be in electronic communication with the controller circuit via the first and second wires.

In response to receiving a mixed CCT from the selector, the controller circuit may apply a voltage, having a first polarity, to the first output pole and the second output pole for a first fraction of time. In response to receiving the mixed CCT, the controller circuit may apply a voltage, having a second polarity, to the first output pole and the second output pole for a second fraction of time. The second polarity may be opposite the first polarity. The first polarity may be positive, while the second polarity may be negative. The first polarity may be negative while the second polarity may be positive. The first fraction of time may correspond to the mixed CCT. The second fraction of time may correspond to the mixed CCT. The first fraction of time and the second fraction of time may correspond to the mixed CCT.

When the selector is in a first position, the controller may control the first output pole to be a positive output pole and the second output pole to be a negative output pole. When the first output pole is a positive output pole and the second output pole is a negative output pole, first CCT LEDs may be ON and second CCT LEDs may be OFF. At this time, the CCT of the light emitted may be the first CCT.

When the selector is in a second position, the controller may control the first output pole to be a negative output pole and the second output pole to be a positive output pole. When the first output pole is a negative output pole and the second output pole is a positive output pole, first CCT LEDs may be OFF and second CCT LEDs may be ON. At this time, the CCT of the light emitted may be the second CCT.

When the user-operable CCT selector is in a third position the controller may control the first output pole for a first fraction of the time to be a positive output pole and for a second fraction of time to be a negative output pole. The second output pole may have a polarity opposite that of the first output pole. When the positive and negative frequency is large enough, the CCT of the light emitted by the first CCT LEDs and the second CCT LEDs may include a mixture of the first and second CCT. The mixed CCT may be a CCT value included in the range listed in Table 1.

The first position may correspond to the first CCT. The second position may correspond to the second CCT. The third position may correspond to any suitable mixing of the first and second CCT. The third position may include any suitable number of positions. Each of the positions may correspond to a different mixed CCT. The positions may be programmable by a user. The positions may be selectable by a user. The positions may be continuous. The positions may be analog positions. The positions may be digital positions.

A switching cycle, during which the first CCT LEDs are illuminated for the first fraction of time and the second CCT LEDs are illuminated for the second fraction of time may have any suitable duration.

The first and second fractions may be the same. The first and second fractions may be different. A sum of the first fraction and the second fraction may be about 1. The first fraction and the second fraction may be sized to result in a desired CCT mix between the first CCT and the second CCT. Table 2 lists illustrative ranges that may include the first and second fractions.

TABLE 2

Ranges that may include the first and second fractions.

| Illustrative range endpoints | | | |
|---|---|---|---|
| Lower | Upper | Lower | Upper |
| <0.05 | 0.05 | 0.50 | 0.55 |
| 0.05 | 0.10 | 0.55 | 0.60 |
| 0.10 | 0.15 | 0.60 | 0.65 |
| 0.15 | 0.20 | 0.65 | 0.70 |
| 0.20 | 0.25 | 0.70 | 0.75 |
| 0.25 | 0.30 | 0.75 | 0.80 |
| 0.30 | 0.35 | 0.80 | 0.85 |
| 0.35 | 0.40 | 0.85 | 0.90 |
| 0.40 | 0.45 | 0.90 | 0.95 |
| 0.45 | 0.50 | 0.95 | >0.95 |
| Other suitable lower endpoints | Other suitable upper endpoints | Other suitable lower endpoints | Other suitable upper endpoints |

The light tape may include a first cover configured to cover the first array of LEDs. The first cover may be disposed on the first side of the first segment. The light tape may include a second cover configured to cover the second array of LEDs. The second cover may be disposed on the second side of the first segment.

The first cover and the second cover may include a translucent material. The translucent material may be transparent. The translucent material may be partially opaque. The translucent material may include acrylic. The translucent material may include crystal. The translucent material may include glass. The translucent material may include a polymer. The translucent material may include silicone. The material may include phosphor. The translucent material may include any other suitable material.

The translucent material may be yellow. The translucent material may be white. The translucent material may be clear. The translucent material may be any suitable color.

The first cover may include an outer surface. The outer surface may be convex relative to the first array of LEDs. The second cover may include an outer surface. The outer surface may be convex relative to the second array of LEDs.

The first cover may cover the first array of LEDs and the at least one LED disposed on the first extension. The second cover may cover the second array of LEDs and the at least one LED disposed on the second extension.

The LEDs included in the first array of LEDs may be spaced in a first pattern. The at least one LED disposed on the first extension may be spaced along the first pattern. The LEDs included in the second array of LEDs may be spaced in a second pattern. The at least one LED disposed on the second extension may be spaced along the second pattern. The first and second patterns may have one or more features in common. The first and second patterns may be repetitive spaced patterns. The first and second patterns may be irregular spaced patterns. The first and second patterns may be any suitable patterns.

The LEDs included in the first array of LEDs may be spaced equidistant from one another. The LEDs included in the first array of LEDs may be spaced at different distances from one another. The LEDs included in the first array of LEDs may be spaced in any combination of equidistance and different distances from one another. The LEDs included in the second array of LEDs may be spaced equidistant from one another. The LEDs included in the second array of LEDs may be spaced at different distances from one another. The LEDs included in the second array of LEDs may be spaced in any combination of equidistance and different distances from one another.

When the first segment is connected to the second segment at the joint, the first array of LEDs disposed on the first segment may be aligned with a first array of LEDs disposed on the second segment. When the first segment is connected to the second segment at the joint, the first array of LEDs disposed on the first segment may be at least partially aligned with the first array of LEDs disposed on the second segment. When the first segment is connected to the second segment at the joint, the second array of LEDs disposed on the first segment may be aligned with a second array of LEDs disposed on the second segment. When the first segment is connected to the second segment at the joint, the second array of LEDs disposed on the first segment may be at least partially aligned with the second array of LEDs disposed on the second segment.

Connecting the first segment and the second segment at the joint may provide continuous illumination between the first segment and the second segment. Because of the at least one LED disposed on the first extension, there may be continuous illumination from the first array of LEDs disposed on the first segment and the first array of LEDs disposed on the second segment. Because of the at least one LED disposed on the second extension, there may be continuous illumination from the second array of LEDs disposed on the first segment and the second array of LEDs disposed on the second segment. The joint may not disrupt illumination between the first segment and the second segment.

Apparatus and methods for providing a light tape segment are provided.

The light tape segment may be a first light tape segment. The first light tape segment may include a first side. The first light tape segment may include as second side. The second side may be a different side than the first side. The second side may be opposite the first side.

The first light tape segment may include a first extension. The first extension may extend from the first light tape segment. The first light tape segment may include a second extension. The second extension may extend from the first light tape segment.

The first light tape segment may include a first array of LEDs. The first array of LEDs may be disposed along the first side of the first light tape segment. The first array of LEDs may emit light in a first direction. The first array of LEDs may include two or more LEDs. The two or more LEDs may be connected in parallel, in series, or any combination of serial and parallel connections.

The first light tape segment may include a second array of LEDs. The second array of LEDs may be disposed along the second side of the first light tape segment. The second array of LEDs may emit light in a second direction. The second direction may be different from the first direction. The second direction may be opposite the first direction. The second array of LEDs may include two or more LEDs. The two or more LEDs may be connected in parallel, in series, or any combination of serial and parallel connections.

At least one LED included in the first array of LEDs may be disposed on the first extension. LEDs included in the second array of LEDs may not be disposed on the first extension. At least one LED included in the second array of LEDs may be disposed on the second extension. LEDs included in the first array of LEDs may not be disposed on the second extension.

The first extension may connect to a third extension. The third extension may extend from a second light tape segment. The second light tape segment may have one or more features in common with the first light tape segment. When the first extension is connected to the third extension, the first extension may from a first joint with the third extension.

The first extension may be electrically connected to the third extension. The first extension may be electrically connected to the third extension with an electrical connection that does not fasten the first extension to the third extension. The first extension may be electrically connected to the third extension with an electrical connection that fastens the first extension to the third extension. The first extension may be mechanically connected to the third extension. The first extension may be mechanically connected to the third extension with a mechanical connection that does not conduct electricity from the first extension to the third extension. The first extension may be mechanically connected to the third extension with a mechanical connection that conducts electricity from the first extension to the third extension.

The second extension may connect to fourth extension. The fourth extension may extend from a third light tape segment. The third light tape segment may have one or more features in common with one or more of the first light tape segment and the second light tape segment. When the second extension is connected to the fourth extension, the second extension may form a second joint with the fourth extension.

The second extension may be electrically connected to the fourth extension. The second extension may be electrically connected to the fourth extension with an electrical connection that does not fasten the second extension to the fourth extension. The second extension may be electrically connected to the fourth extension with an electrical connection that fastens the second extension to the fourth extension. The second extension may be mechanically connected to the fourth extension. The second extension may be mechanically connected to the fourth extension with a mechanical connection that does not conduct electricity from the second extension to the fourth extension. The second extension may be mechanically connected to the fourth extension with a mechanical connection that conducts electricity from the second extension to the fourth extension.

The first extension may be connected to the third extension via a first weld. The second extension may be connected to the fourth extension via a second weld. The first and second welds may include plastic welds, chemical welds, ultrasonic welds, fusion welds, or any other suitable welds.

The first extension may be connected to the third extension via a first magnet. The second extension may be connected to the fourth extension via a second magnet. The first and second magnets may include permanent magnets, electromagnets, temporary magnets, ferromagnetic materials, paramagnetic materials, diamagnetic materials or any other suitable magnets or magnetic materials.

The first extension may be connected to the third extension via a first adhesive. The second extension may be connected to the fourth extension via a second adhesive. The first and second adhesives may include glues, tapes, epoxy adhesives, polyurethane adhesives, acrylic adhesives, hot melt adhesives or any other suitable adhesives.

The first extension may be connected to the third extension via any suitable connector or connection. The second extension may be connected to the fourth extension via any suitable connector or connection.

The first extension may include first electrical contacts. The first electrical contacts may include one or more positive electrical contacts and one or more negative electrical contacts. The third extension may include third electrical contacts. The third electrical contacts may include one or more positive electrical contacts and one or more negative electrical contacts. The first electrical contacts may electrically connect to the third electrical contacts.

The second extension may include second electrical contacts. The second electrical contacts may include one or more positive electrical contacts and one or more negative electrical contacts. The fourth extension may include fourth electrical contacts. The fourth electrical contacts may include one or more positive electrical contacts and one or more negative electrical contacts. The second electrical contacts may electrically connect to the fourth electrical contacts.

The first extension may define a first face. The first electrical contacts may be exposed on the first face. The first electrical contacts may be electrical contacts that do not extend beyond the first face. The first electrical contacts may extend beyond the first face. The second extension may define a second face. The second electrical contacts may be exposed on the second face. The second electrical contacts may be electrical contacts that do not extend beyond the second face. The second electrical contacts may extend beyond the second face. The third extension may define a third face. The third electrical contacts may be exposed on the third face. The third electrical contacts may be electrical contacts that do not extend beyond the third face. The third electrical contacts may extend beyond the third face. The fourth extension may define a fourth face. The fourth electrical contacts may be exposed on the fourth face. The fourth electrical contacts may be electrical contacts that do not extend beyond the fourth face. The fourth electrical contacts may extend beyond the fourth face.

When the first face is in contact with the third face, the first electrical contacts may be in contact with the third electrical contacts. When the first electrical contacts are in contact with the third electrical contacts, electricity may be conducted from the first light tape segment to the second light tape segment.

When the second face is in contact with the fourth face, the second electrical contacts may be in contact with the fourth electrical contacts. When the second electrical contacts are in contact with the fourth electrical contacts, electricity may be conducted from the first light tape segment to the third light tape segment.

The first light tape segment may include a PCB. The first array of LEDs may be disposed on a first side of the PCB. The second array of LEDs may be disposed on a second side of the PCB. The first side of the PCB may be opposite the second side of the PCB.

The PCB may be a first PCB. When the PCB is a first PCB, the light tape segment may include a second PCB. The first array of LEDs may be disposed on the first PCB. The second array of LEDs may be disposed on the second PCB. The first PCB may be disposed opposite the second PCB. The first PCB may be disposed back-to-back with the second PCB.

The first array of LEDs may include first CCT LEDs. The first array of LEDs may include second CCT LEDs. The second array of LEDs may include first CCT LEDs. The second array of LEDs may include second CCT LEDs. The first CCT LEDs and second CCT LEDs may include any suitable CCT as listed in Table 1.

The first light tape segment may include a first output pole. The first output pole may be a positive electrical contact. The first output pole may be a positive electrical contact disposed on the first extension. The first light tape segment may include a second output pole. The second output pole may be a negative electrical contact. The second output pole may be a negative pole disposed on the first extension. The first segment may receive power via a first conductor connected to the first output pole. The first conductor may be included in a first wire. The first segment may receive power via a second conductor connected to the second output pole. The second conductor may be included in a second wire.

The first and second conductors may include copper. The first and second conductors may include aluminum. The first and second conductors may include any suitable conducting metal.

The first segment may receive power only via the first wire and the second wire. The first and second wires may be soldered to the first and second output poles. The first and second wires may be connected to the first and second output poles via any suitable connection. The first and second wires may apply voltage to the first output pole and the second output pole.

The first light tape segment may be in electronic communication with a selector. The first light tape segment may be in electronic communication with the selector via the first and second wires. The selector may be used to select a mixed CCT from a plurality of CCT states. The plurality of CCT states may include any suitable combination of the first CCT and the second CCT. The plurality of CCT states may include a plurality of preset or user selectable CCTs. The combination may include 100% of the first CCT and 0% of the second CCT. The combination may include 0% of the first CCT and 100% of the second CCT. The combination may include any suitable percentage of the first CCT and any suitable percentage of the second CCT.

The selector may be a manual selector. The selector may include a switch. The selector may include a dial. The selector may include a slider. The selector may include a button. The selector may include an electronic selector. The selector may include digital user interface. The selector may include a touchpad. The selector may include a wireless sensor. The selector may include a remote-controlled sensor. The selector may include a wired selector. The selector may include any other suitable selector.

The selector may be used to select between three CCT states. The selector may be used to select between five CCT states. The selector may be used to select between any suitable number of CCT states. The selector may be used to select from a continuous range of mixed CCTs between the first CCT and the second CCT. The selector may be used to select from a continuous range of mixed CCTs between the first CCT and the second CCT including the first CCT and the second CCT.

The first light tape segment may be in electronic communication with a controller circuit. The controller circuit may include a microcontroller. The controller circuit may include any other suitable controller. The controller circuit may be in electronic communication with the selector. The first light tape segment may be in electronic communication with the controller circuit via the first and second wires.

In response to receiving a mixed CCT from the selector, the controller circuit may apply a voltage, having a first polarity, to the first output pole and the second output pole for a first fraction of time. In response to receiving the mixed CCT, the controller circuit may apply a voltage, having a second polarity, to the first output pole and the second output pole for a second fraction of time. The second polarity may be opposite the first polarity. The first polarity may be positive, while the second polarity may be negative. The first polarity may be negative while the second polarity may be positive. The first fraction of time may correspond to the mixed CCT. The second fraction of time may correspond to the mixed CCT. The first fraction of time and the second fraction of time may correspond to the mixed CCT.

When the selector is in a first position, the controller may control the first output pole to be a positive output pole and the second output pole to be a negative output pole. When the first output pole is a positive output pole and the second output pole is a negative output pole, first CCT LEDs may be ON and second CCT LEDs may be OFF. At this time, the CCT of the light emitted may be the first CCT.

When the selector is in a second position, the controller may control the first output pole to be a negative output pole and the second output pole to be a positive output pole. When the first output pole is a negative output pole and the second output pole is a positive output pole, first CCT LEDs may be OFF and second CCT LEDs may be ON. At this time, the CCT of the light emitted may be the second CCT.

When the user-operable CCT selector is in a third position the controller may control the first output pole for a first fraction of the time to be a positive output pole and for a second fraction of time to be a negative output pole. The second output pole may have a polarity opposite that of the first output pole. When the positive and negative frequency is large enough, the CCT of the light emitted by the first CCT LEDs and the second CCT LEDs may include a mixture of the first and second CCT. The mixed CCT may be a CCT value included in the range listed in Table 1.

The first position may correspond to the first CCT. The second position may correspond to the second CCT. The third position may correspond to any suitable mixing of the first and second CCT. The third position may include any suitable number of positions. Each of the positions may correspond to a different mixed CCT. The positions may be programmable by a user. The positions may be selectable by a user. The positions may be continuous. The positions may be analog positions. The positions may be digital positions.

A switching cycle, during which the first CCT LEDs are illuminated for the first fraction of time and the second CCT LEDs are illuminated for the second fraction of time may have any suitable duration.

The first and second fractions may be the same. The first and second fractions may be different. A sum of the first fraction and the second fraction may be about 1. The first fraction and the second fraction may be sized to result in a desired CCT mix between the first CCT and the second CCT. The first and second fractions may include any suitable fractions, as listed in Table 2.

The first light tape segment may include a first cover configured to cover the first array of LEDs. The first cover may be disposed on a first side of the first light tape segment. The first cover may also cover the first extension. The first light tape segment may include a second cover configured to cover the second array of LEDs. The second cover may be disposed on a second side of the first light tape segment. The second cover may also cover the second extension.

The first cover and the second cover may include a translucent material. The translucent material may be transparent. The translucent material may be partially opaque. The translucent material may include acrylic. The translucent material may include crystal. The translucent material may include glass. The translucent material may include a polymer. The translucent material may include silicone. The material may include phosphor. The translucent material may include any suitable material.

The translucent material may be yellow. The translucent material may be white. The translucent material may be clear. The translucent material may be any suitable color.

The first cover may include an outer surface. The outer surface may be convex relative to the first array of LEDs. The second cover may include an outer surface. The outer surface may be convex relative to the second array of LEDs.

The first cover may cover the first array of LEDs and the first extension. The second cover may cover the second array of LEDs and the second extension.

The LEDs included in the first array of LEDs may be spaced in a first pattern. The at least one LED disposed on the first extension may be spaced along the first pattern. The LEDs included in the second array of LEDs may be spaced in a second pattern. The at least one LED disposed on the second extension may be spaced along the second pattern. The first and second patterns may have one or more features in common. The first and second patterns may be repetitive spaced patterns. The first and second patterns may be irregular spaced patterns. The first and second patterns may be any suitable patterns.

The LEDs included in the first array of LEDs may be spaced equidistant from one another. The LEDs included in the first array of LEDs may be spaced at different distances from one another. The LEDs included in the first array of LEDs may be spaced in any combination of equidistance and different distances from one another. The LEDs included in the second array of LEDs may be spaced equidistant from one another. The LEDs included in the second array of LEDs may be spaced at different distances from one another. The LEDs included in the second array of LEDs may be spaced in any combination of equidistance and different distances from one another.

When the first light tape segment is connected to the second light tape segment, the first array of LEDs disposed on the first light tape segment may be aligned with a first array of LEDs disposed on the second light tape segment. When the first light tape segment is connected to the second light tape segment, the first array of LEDs disposed on the first light tape segment may be at least partially aligned with the first array of LEDs disposed on the second light tape segment. When the first light tape segment is connected to the second light tape segment, the second array of LEDs disposed on the first light tape segment may be aligned with a second array of LEDs disposed on the second light tape segment. When the first light tape segment is connected to the second light tape segment, the second array of LEDs disposed on the first light tape segment may be at least partially aligned with the second array of LEDs disposed on the second light tape segment.

Connecting the first light tape segment and the second light tape segment at the first joint may provide continuous illumination between the first light tape segment and the second light tape segment. Because of the at least one LED disposed on the first extension, there may be continuous illumination from the first array of LEDs disposed on the first light tape segment and the first array of LEDs disposed on the second light tape segment. Because of the at least one LED disposed on the third extension, there may be continuous illumination from the second array of LEDs disposed on the first light tape segment and the second array of LEDs disposed on the second light tape segment. The first joint may not disrupt illumination between the first light tape segment and the second light tape segment.

Apparatus and methods for lighting are provided.

The apparatus may include one or more sections. The one or more sections may include one or more light tape segments. Each section may include one or more of an LED light source, a PCB including a circuit for providing current to the LED light source, a structure for connection to another section, conductors for electrical continuity with another section, optically diffusive material, ornamental material and any other suitable features.

The apparatus may include a first section. The first section may be a first light tape segment. The apparatus may include a second section. The second section may be a second light tape segment. The first section may be connectable to the second section.

The first section may include a first extension. The first section may include a first face. The first face may include electrical contacts. The electrical contacts may include conductors. The electrical contacts may include a positive electrical contact. The electrical contacts may include one or more positive electrical contacts. The electrical contacts may include a negative electrical contact. The electrical contacts may include one or more negative electrical contacts. The first section may include a second face. The second face may not include electrical contacts.

The second section may include a second extension. The second section may include a third face. The third face may include electrical contacts. The electrical contacts may include conductors. The electrical contacts may include a positive electrical contact. The electrical contacts may include one or more positive electrical contacts. The electrical contacts may include a negative electrical contact. The electrical contacts may include one or more negative electrical contacts. The second section may include a fourth face. The fourth face may be a face that does not include electrical contacts.

The first face may be linked to the third face. Linking the first face to the third face may include providing contact between the first face and the third face. Contact between the first face and the third face may provide electrical continuity between the first section and the second section.

The first face may link to the third face via a magnetic connection. The first face may link to the third face via a mechanical connection. The first face may link to the third face via an adhesive connection. The first face may link to the third face via a weld. The weld may be a plastic weld. The weld may be a chemical weld. The weld may be an ultrasonic weld. The weld may be a fusion weld. The weld may be any suitable weld. The first face may link to the third face with any suitable connection.

The first section may include a first PCB. The first PCB may include a first LED. The first LED may have a first CCT. The first LED may be included in a first string of LEDs having the first CCT. The first string of LEDs may include a one or more LEDs. The one or more LEDs may be connected in parallel, in series, or in any combination of serial and parallel connections. The one or more LEDs may include LEDs that are not connected to each other. The first PCB may include a second LED. The second LED may have a second CCT. The first CCT may be different from the second CCT. The second LED may be included in a second string of LEDs having the second CCT. The second string of LEDs may include a one or more LEDs. The one or more LEDs may be connected in parallel, in a series, or in any combination of serial and parallel connections. The one or more LEDs may include LEDs that are not connected to each other. The first CCT and the second CCT may include any suitable CCT as listed in Table 1.

The first string of LEDs may be connected to the second string of LEDs in parallel. LEDs from the first string of LEDs may be connected to LEDs from the second string of LEDs in a series. LEDs from the first string of LEDs may not be connected to LEDs from the second string of LEDs.

LEDs from the first string of LEDs and the second string of LEDs may be disposed on a first side of the PCB. LEDs from the first string of LEDs and the second string of LEDs may be disposed on a second side of the PCB. The second side of the PCB may be different from the first side of the PCB. The second side may be opposite the first side.

The PCB may be a single PCB. The PCB may include LEDs disposed on each of the two sides of the single PCB. The PCB may include LEDs disposed only on one side of the single PCB. The single PCB may be folded to provide LEDs facing in two different directions. The two different directions may be different from each other. The single PCB may be wrapped around so that LEDs may face multiple different directions. The PCB may include two PCBs. Each of the PCBs may include LEDs disposed on one side of the PCB. The two PCBs may be attached so that the LEDs are facing in two different directions. The two different directions may be opposite from each other.

The first section may extend in a first direction. LEDs from the first and second strings of LEDs may be disposed on the first side of the PCB. The LEDs may be disposed in a row.

The LEDs may be disposed along the first direction. LEDs from the first second strings of LEDs may be disposed on the second side of the PCB. The LEDs may be disposed in a row. The LEDs may be disposed along the first direction.

The first side and second side of the PCB may be covered by a material. The first side of the PCB may be covered by a first bead of the material. The first bead of material may be disposed on top of the LEDs. The second side of the PCB may be covered by a second bead of the material. The second bead of material may be disposed on top of the LEDs. The first bead and the second bead may be attached to the PCB. When the first side is covered with the first bead and the second side is covered with the second bead, parts of the PCB may be exposed. When the first side is covered with the first bead and the second side is covered with the second bead, the PCB may not be exposed.

The first side and the second side of the PCB may be surrounded by the material. When the first side and the second side of the PCB are surrounded by the material, the PCB may not be exposed. When the first side and the second side of the PCB are surrounded by the material, the PCB may be partially exposed.

The material may include optically diffusive material. The material may include silicon. The material may include phosphor. The material may include any suitable optically diffusive materials. The material may be yellow. The material may be any suitable color. The material may include translucent material. The translucent material may be transparent. The material may be any suitable material.

The first side and second side of the PCB may be surrounded by a silicone tube. The silicone tube may have an inner diameter of 10-15 mm. The silicone tube may have an outer diameter of 11-20 mm. The silicone tube may have any suitable inner diameter. The first side and the second side may be surrounded by a silicone tube having any suitable outer diameter.

The first extension may extend along the first direction. LEDs from the first and second strings of LEDs may be disposed on the second face of the first extension. The LEDs disposed on the second face may be covered by the material. LEDs from the first and second strings of LEDs may not be disposed on the first face of the first extension.

The second section may extend along the first direction. The second section may include a second PCB. The second PCB may include one or more features as described in connection with the first PCB. LEDs of the first and second strings of LEDs may be disposed on a first side of the second PCB in a row along the first direction. LEDs of the first and second strings of LEDs may be disposed on a second side of the second PCB in a row along the first direction.

The second extension may extend along the first direction. LEDs from the first and second strings of LEDs may be disposed on the fourth face of the second extension. The LEDs disposed on the fourth face may be covered by the material. LEDs from the first and second strings of LEDs may not be disposed on the third face of the second extension.

When the first face of the first extension contacts the third face of the second extension, the second face of the first extension may not contact the fourth face of the second extension. The one or more positive contacts included in the first extension may contact the one or more positive contacts included in the second extension. The one or more negative contacts included in the first extension may contact the one or more negative contacts included in the second extension. Contact of the positive and negative contacts may provide electrical continuity between the first section and the second section. The first face of the first extension may contact the third face of the extension to provide electrical continuity in a second direction. The second direction may be a direction that is transverse to the first direction.

LEDs disposed along the second face of the first extension may form a continuous row with LEDs disposed on the second section when the first face and the third face are connected. LEDs disposed on the fourth face of the second extension may form a continuous row with LEDs disposed on the first section when the first face and the third face are connected. A user may not easily perceive, between the first section and the second section, a discontinuity of illumination when the first section and the second section are connected. Connection between the first face and the third face may provide continuous lighting along the first section and second section. Connection between first face and the third face may emit bidirectional light. Connection between first face and the third face may emit omnidirectional light.

The first and second LED strings may be included in an LED module. The LED module may include a first output pole and a second output pole. The LED module may receive voltage via two wires. The LED module may receive voltage via two or more wires. Voltage may be transmitted to the first and second LED strings via the two wires. A first wire may transmit a positive voltage. The positive voltage may be transmitted from the first section to the second section via the one or more positive contacts included in the first face and the third face. A second wire may transmit a negative voltage. The negative voltage may be transmitted from the first section to the second section via the one or more negative contacts included in the first face and the third face. The first output pole and the second output pole may receive voltage from the two wires. The voltage may be transmitted to the first and second LED strings.

The first section and the second section may emit light. The first section and the second section may emit light having a mixed CCT. The mixed CCT may be user selectable. The mixed CCT may include a mixture of the first CCT and the second CCT. The mixture may include 100% of the first CCT and 0% of the second CCT. The mixture may include 0% of the first CCT and 100% of the second CCT. The mixture may include any suitable percentage of the first CCT and any suitable percentage of the second CCT. The mixed CCT may be any suitable CCT. A user may select between three CCTs. The user may select between five CCTs. The user may select between any suitable number of CCTs. The user may select from a continuous range of mixed CCTs between the first CCT and the second CCT. The user select from a continuous range of mixed CCTs between the first CCT and the second CCT including the first CCT and the second CCT.

The apparatus may include a controller. The controller may be a microcontroller. The controller may be any suitable controller. The controller may include a user-operable CCT selector. The user-operable CCT selector may have two or more settings. The two or more settings may correspond to different outputs at the first output pole and the second output pole. The user-operable CCT selector may be mechanically operable. The user-operable CCT selector may be electronically operable. The user-operable CCT selector may be electronically operable using a software. The user-operable CCT selector may be electronically operable using a software application. The user-operable CCT selector may be wirelessly operable.

When the user-operable CCT selector is in a first position, the controller may control the first output pole to be a positive output pole and the second output pole to be a negative output pole. When the first output pole is a positive output pole and the second output pole is a negative output pole, LEDs from the first string of LEDs may be ON and LEDs from the second string of LEDs may be OFF. At this time, the CCT of the light emitted may be the first CCT.

When the user-operable CCT selector is in a second position, the controller may control the first output pole to be a negative output pole and the second output pole to be a positive output pole. When the first output pole is a negative output pole and the second output pole is a positive output pole, LEDs from the first string of LEDs may be OFF and LEDs from the second string of LEDs may be ON. At this time, the CCT of the light emitted may be the second CCT.

When the user-operable CCT selector is in a third position the controller may control the first output pole a first fraction of the time to be a positive output pole and a second fraction of time to be a negative output pole. The second output pole may have a polarity opposite that of the first output pole.

When the positive and negative frequency is large enough, the CCT of the first and section may be a mixture of the first and second CCT. The mixed CCT may be a CCT value included in the range listed in Table 1.

The first position may correspond to the first CCT. The second position may correspond to the second CCT. The third position may correspond to any suitable mixing of the first and second CCT. The third position may include any suitable number of positions. Each of the positions may correspond to a CCT mixture. The positions may be programmable by a user. The positions may be selectable by a user. The positions may be continuous. The positions may be included in a slider. The positions may be analog positions. The positions may be digital positions.

A switching cycle, during which the first string of LEDs are illuminated for a first fraction of time and the second string of LEDs are illuminated for a second fraction of time may have any suitable duration.

The first and second fractions may be the same. The first and second fractions may be different. A sum of the first fraction and the second fraction may be about 1. The first fraction and the second fraction may be sized to result in a desired CCT mix between the first CCT and the second CCT. The first fraction of time and the second fraction of time may include any suitable fraction of time, as listed in Table 2.

The apparatus may include any suitable number of sections. Each section may include a first extension and a second extension. Each section may connect to a second section using the first extension. Each section may connect to a third section using the second extension. The first extension of the section may connect to a second extension of the second section. The second extension of the first section may connect to a first extension of the third section.

The sections may be flexible. The sections may be bendable. The sections may be twistable. The sections may be rigid. The sections may have any suitable flexibility.

The sections may be configured to be insertable into a fixture. The fixture may be a tubular fixture. The fixture may be any suitable fixture.

The first and second extensions may be removeable. The first and second extensions may be insertable onto ends of any suitable section. The first and second extensions may not be removeable.

Illustrative embodiments of apparatus and methods in accordance with the principles of the invention will now be described with reference to the accompanying drawings, which form a part hereof. It is to be understood that other embodiments may be utilized and that structural, functional and procedural modifications or omissions may be made without departing from the scope and spirit of the present invention.

Some embodiments may omit features shown and/or described in connection with the illustrative apparatus. Some embodiments may include features that are neither shown nor described in connection with the illustrative apparatus. Features of illustrative apparatus may be combined. For example, one illustrative embodiment may include features shown in connection with another illustrative embodiment.

Embodiments may involve some or all of the features of the illustrative apparatus and/or some or all of the steps of the methods associated therewith.

FIG. 1 shows schematic cross-sectional view of light tape 100. Light tape 100 may include light tape segment 102. Light tape 100 may include light tape segment 104. Light tape segment 102 may be connected to light tape segment 104 at joint 106.

Light tape segment 102 may extend along axis $L_2$. LED array 114 may be disposed on a first side of light tape segment 102. LED array 114 may be disposed along axis $L_2$. LEDs included in LED array 114 may emit light in direction $D_1$. LED array 116 may be disposed on a second side of light tape segment 102. LED array 116 may be disposed along axis $L_2$. LEDs included in LED array 116 may emit light in direction $D_2$. The second side of light tape segment 102 may be opposite the first side of light tape segment 102.

LED array 114 and LED array 116 may include first CCT LEDs and second CCT LEDs. First CCT LEDs and second CCT LEDs may include any suitable CCT as listed in Table 1.

Light tape segment 104 may extend along axis $L_2$. LED array 120 may be disposed on a first side of light tape segment 104. LED array 120 may be disposed along axis $L_2$. LEDs included in LED array 120 may emit light in direction $D_1$. LED array 118 may be disposed on a second side of light tape segment 104. LED array 118 may be disposed along axis $L_2$. LEDs included in LED array 118 may emit light in direction $D_2$. The second side of light tape segment 104 may be opposite the first side of light tape segment 104.

LED array 120 and LED array 118 may include first CCT LEDs and second CCT LEDs. First CCT LEDs and second CCT LEDs may include any suitable CCT as listed in Table 1.

Light tape segment 102 may include extension 122. Extension 122 may extend from light tape segment 102 along axis $L_2$. Light tape segment 104 may include extension 124. Extension 124 may extend along axis $L_2$.

LEDs from LED array 116 may be disposed along extension 122. LEDs included in LED array 116 may define a first pattern along light tape segment 102. LEDs that are disposed along extension 122 may be included in the first pattern.

LEDs from LED array 120 may be disposed along extension 124. LEDs included in LED array 120 may define a second pattern along light tape segment 104. LEDs that are disposed along extension 124 may be included in the second pattern.

When light tape segment 102 is connected to light tape segment 104, LED array 118 may be spaced along the first pattern. When LED array 118 is spaced along the first pattern, LEDs included in LED array 118 and LED array 116 may be at least partially aligned in a continuous row. When light tape segment 102 is connected to light tape segment 104, LED array 114 may be spaced along the second pattern. When LED array 114 is spaced along the second pattern, LEDs included in LED array 120 and LED array 114 may be at least partially aligned in a continuous row. The first pattern may be the same as the second pattern. The first pattern may be different from the second pattern.

Cover 108 may cover the first side of light tape segment 102. Cover 108 may cover LED array 114. Cover 110 may cover the second side of light tape segment 102. Cover 110 may cover LED array 116. Cover 112 may cover the first side of light tape segment 104. Cover 112 may cover LED array 120. Cover 113 may cover the second side of light tape segment 104. Cover 113 may cover LED array 118.

Covers 108, 110, 112 and 113 may include a translucent material. Covers 108, 110, 112 and 113 may have a shape. The shape may be a curved shape. The shape may be rounded shape. The shape may be any suitable shape.

Extension 122 may include face 136. Extension 122 may include positive electrical contact 130. Positive electrical contact 130 may include one or more positive electrical contacts. Extension 122 may include negative electrical contact 132. Negative electrical contact 132 may include one or more negative electrical contacts. Positive electrical contact 130 and negative electrical contact 132 may be exposed on face 136. Positive electrical contact 130 and negative electrical contact 132 may not extend beyond face 136.

Extension 124 may include face 134. Extension 124 may include positive electrical contact 126. Positive electrical contact 126 may include one or more positive electrical contacts. Extension 124 may include negative electrical contact 128. Negative electrical contact 128 may include one or more negative electrical contacts. Positive electrical contact 126 and negative electrical contact 128 may be exposed on face 134. Positive electrical contact 126 and negative electrical contact 128 may not extend beyond face 134.

When light tape segment 102 is connected to light tape segment 104, face 136 may contact face 134. Face 136 may contact face 134 along axis $L_1$. When face 136 contacts face 134, positive electrical contact 130 may contact positive electrical contact 126. When face 136 contacts face 134, negative electrical contact 132 may contact negative electrical contact 128. When positive electrical contact 130 contacts positive electrical contact 126 and negative electrical contact 132 contacts negative electrical contact 128, electricity may be conducted from light tape segment 102 to light tape segment 104. Electricity may be conducted from light tape segment 102 to light tape segment 104 along axis $L_1$.

When positive electrical contact 130 contacts positive electrical contact 126 and negative electrical contact 132 contacts negative electrical contact 128, light tape segment 102 may not be mechanically connected to light tape segment 104. Light tape segment 102 may be mechanically connected to light tape segment 104 independent of an electrical connection between light tape segment 102 and light tape segment 104. The mechanical connection (not shown) may be along an inner surface of the joint. The mechanical connection may not extend beyond an outer surface of light tape segment 102 and light tape segment 104, defined by covers 108, 110, 112 and 113.

Figure 2:
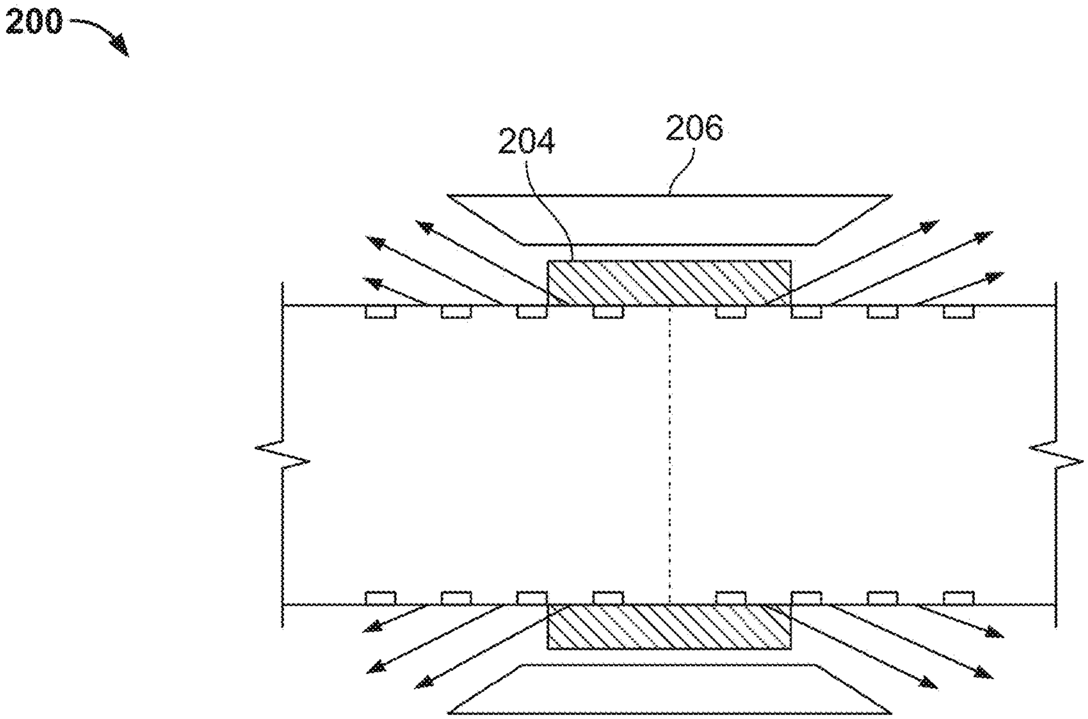
FIG. 2 (Prior Art)
FIG. 2 shows a typical prior art schematic.

FIG. 2 shows a cross-sectional view of prior art light tape 200. Prior art light tape 200 may include mechanical connector 204. Mechanical connector 204 may include a bead, band, clasp, crimp or any other suitable external mechanical connector. Mechanical connector 204 may be disposed on/around an outer surface of light tape 200. Because mechanical connector 204 is disposed on/around the outer surface of light tape 200 shadow 206 may be formed when LEDs included in light tape 200 emit light. Mechanical connector 204 may deflect light emitted by the LEDs around mechanical connector 204. When the light is deflected, shadow 206 may be formed.

Figure 3:
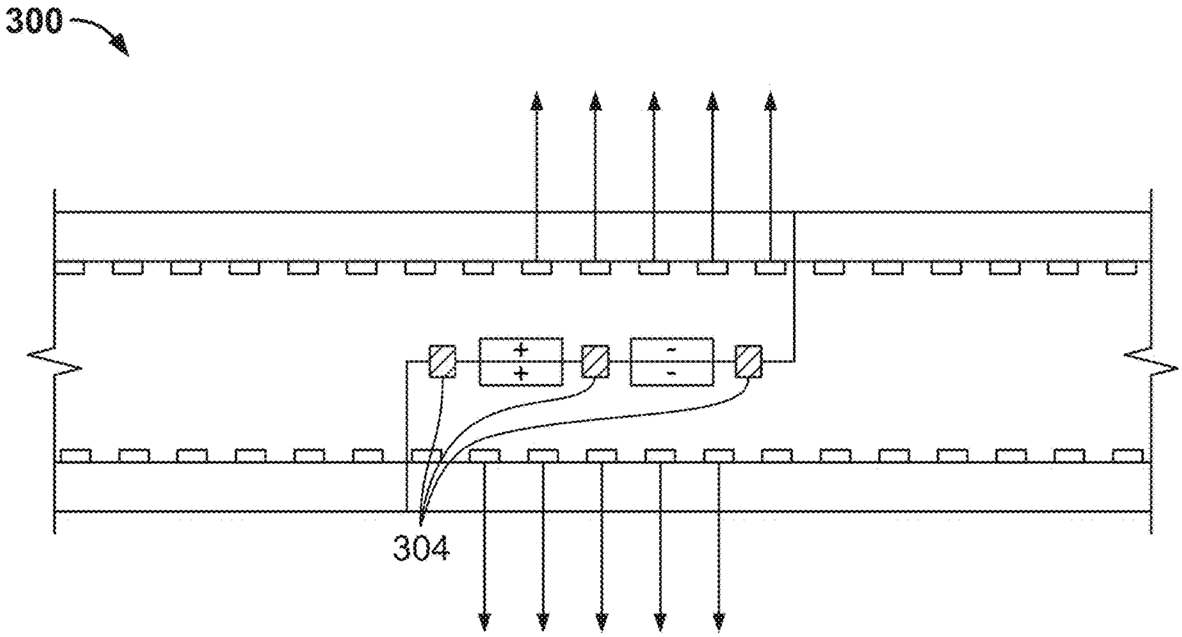
FIG. 3 shows schematically illustrative apparatus in accordance with the principles of the invention.

FIG. 3 shows a schematic cross-sectional view of illustrative light tape 300. Light tape 300 may have one or more features in common with light tape 100. Because mechanical connector(s) 304 are disposed in an inner surface of light tape 300, light emitted by LEDs included in light tape 300 may not create a shadow. Mechanical connector(s) 304 may not interfere with light being emitted from the LEDs.

Figure 4B:
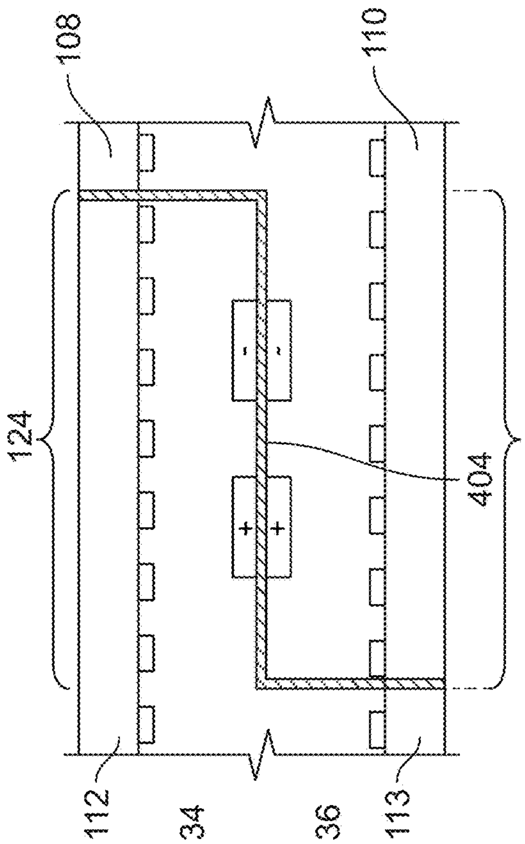
FIGS. 4A-4D show schematically illustrative apparatus in accordance with the principles of the invention.
Figure 4A:
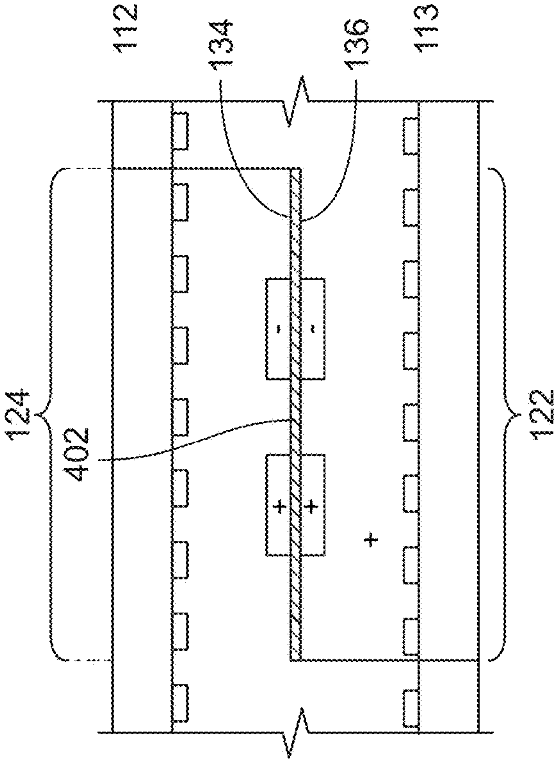

FIG. 4A shows illustrative connection 402. Extension 122 may be connected to extension 124 via connection 402. Connection 402 may include a connection that extends between face 134 and face 136. Connection 402 may include a connection that does not interfere (not shown) with the electrical connection between extension 122 and extension 124. Connection 402 may include a weld, an adhesive, a magnet or any other suitable connection.

FIG. 4B shows illustrative connection 404. Extension 122 may be connected to extension 124 via connection 404. Connection 404 may include a connection that extends between an inner surface of extension 122 and an inner surface of extension 124. Connection 404 may include a connection that also extends between cover 108 and cover 112. Connection 404 may include a connection that further extends between cover 110 and cover 113. Connection 404 may include a connection that does not interfere (not shown) with the electrical connection between extension 122 and extension 124.

Figure 4D:
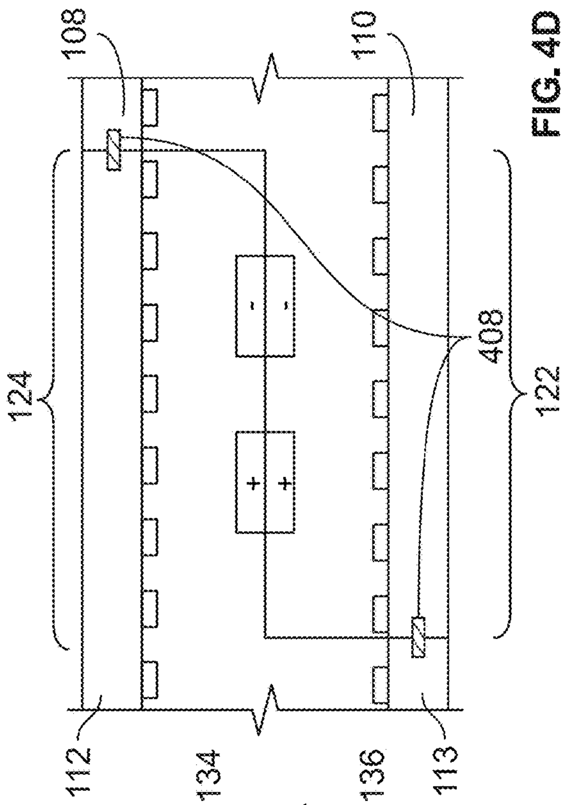
Figure 4C:
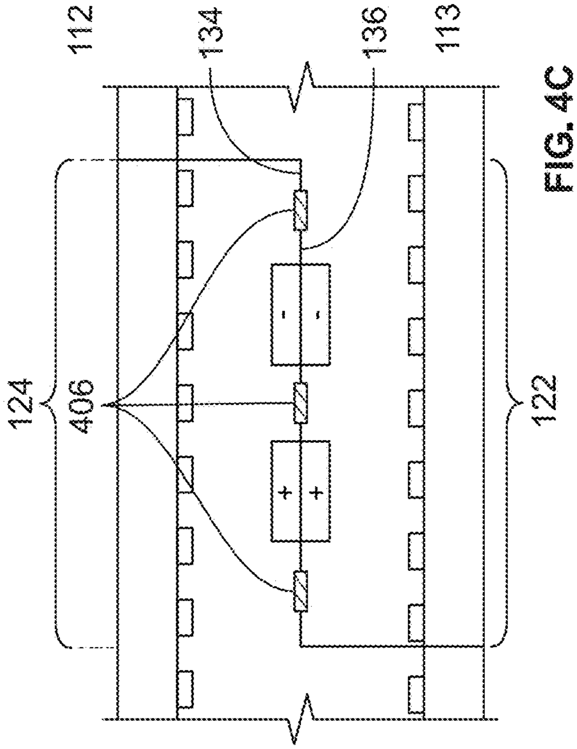

FIG. 4C shows illustrative connectors 406. Extension 122 may be connected to extension 124 via connectors 406. Connectors 406 may include a plurality of connectors that are disposed between face 134 and face 136. Connectors 406 may not interfere with the electrical connection between extension 122 and extension 124. Connectors 406 may include welds, adhesives, magnets or any other suitable connectors.

FIG. 4D shows illustrative connectors 408. Extension 122 may be connected to extension 124 via connectors 408. Connectors 408 may include one or more connectors that are disposed between cover 108 and cover 112. Connectors 408 may include one or more connectors that are disposed between cover 110 and cover 113. Connectors 408 may include welds, adhesives, magnets or any other suitable connectors.

Figure 5:
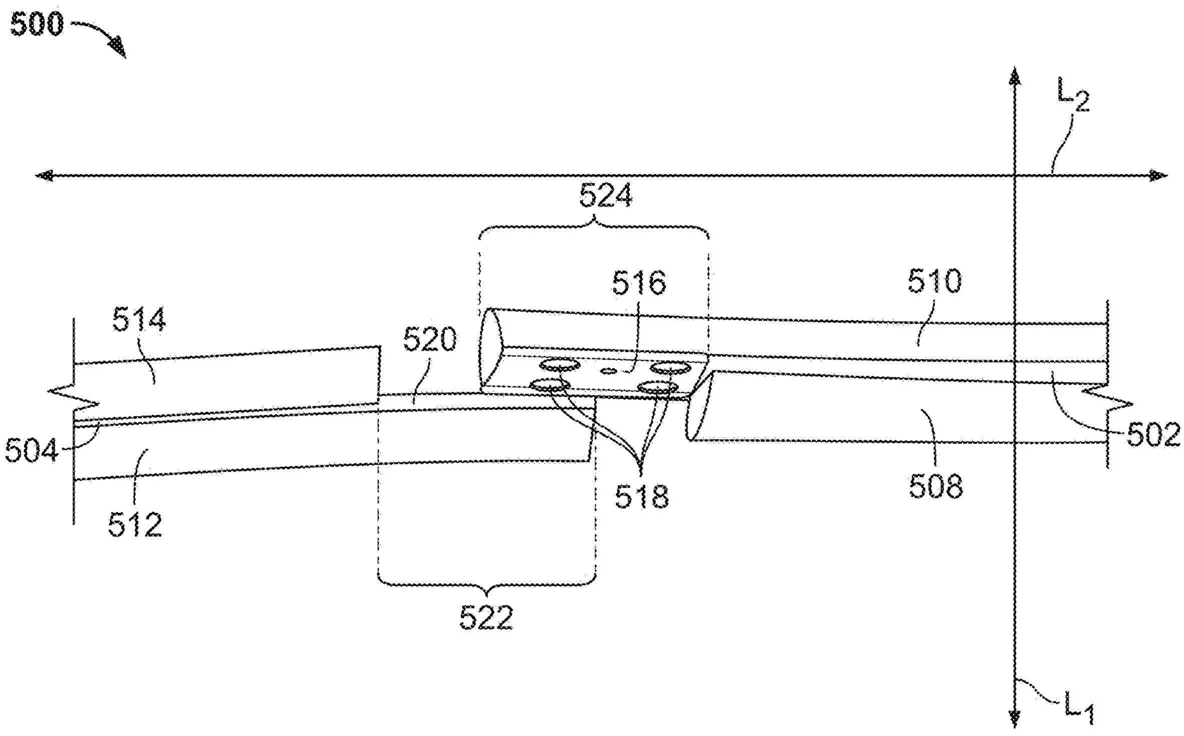
FIG. 5 shows illustrative apparatus in accordance with the principles of the invention.

FIG. 5 shows illustrative light tape 500. Light tape 500 may have one or more features in common with one or more of light tape 100 and light tape 300.

Extension 524 may extend from light tape segment 502. Extension 524 may extend from light tape segment 502 along axis $L_2$. Light tape segment 502 may be covered by cover 508 and cover 510. Extension 524 may only be covered by cover 510. Extension 524 may include surface 516. Surface 516 may not be covered. Surface 516 may not be covered by cover 508.

Extension 522 may extend from light tape segment 504. Extension 522 may extend from light tape segment 504 along axis $L_2$. Light tape segment 504 may be covered by cover 512 and cover 514. Extension 522 may only be covered by cover 512. Extension 522 may include surface 520. Surface 520 may not be covered. Surface 520 may not be covered by 514.

Light tape segment 502 may be connected to light tape segment 504. Light tape segment 502 may be connected to light tape segment 504 at a joint (not shown). The joint may be formed when surface 516 contacts surface 520. Extension 524 may include electrical contacts 518. Extension 522 may include electrical contacts (not shown). When surface 516 contacts surface 520, electrical contacts 518 may contact the electrical contacts included in extension 522. When electrical contacts 518 may contact the electrical contacts included in extension 522, electricity may be conducted along axis $L_1$. In addition to being electronically connected, extension 522 may also be mechanically connected extension 524 via a separate connection (not shown).

Figure 6:
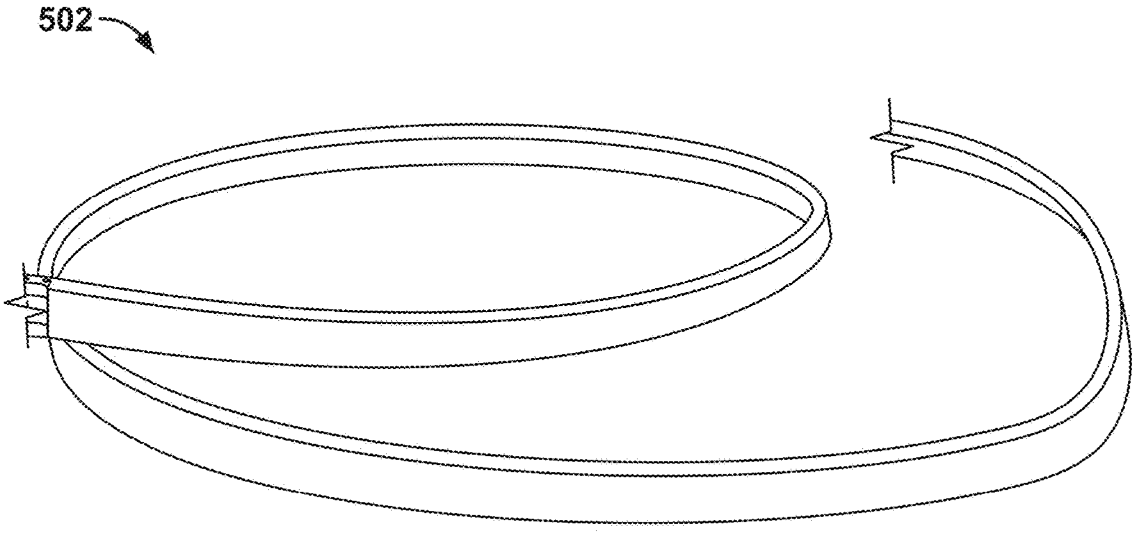
FIG. 6 shows illustrative apparatus in accordance with the principles of the invention.

FIG. 6 shows another view of light tape segment 502. Light tape segment 502 may be flexible. Light tape segment 502 may be able to be shaped. Light tape segment 502 may be curved. Light tape segment 502 may have any suitable form and flexibility.

Figure 7:
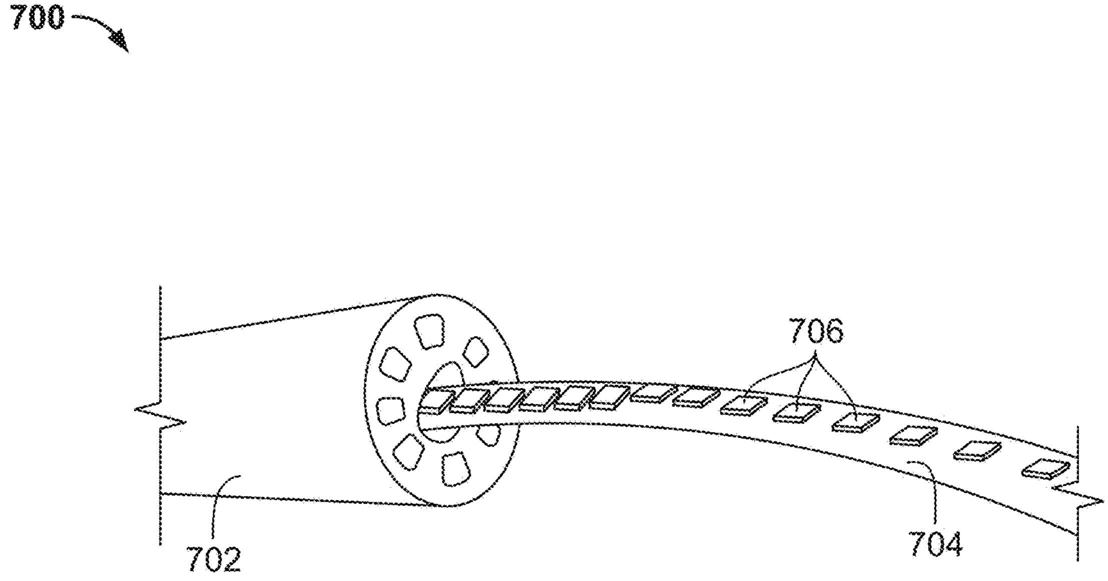
FIG. 7 shows illustrative apparatus in accordance with the principles of the invention.

FIG. 7 shows illustrative light tape 700. Light tape 700 may include one or more features in common with one or more of light tapes 100, 300 and 500.

Light tape 700 may include PCB 704. LEDs 706 may be mounted on PCB 704. LEDs 706 may include first CCT LEDs and second CCT LEDs. LEDs may be mounted on both a first and second side of PCB 704 (not shown). PCB 704 may be disposed inside of tube 702. Tube 702 may surround PCB 704. Tube 702 may include silicone. Tube 702 may include any other suitable material. Tube 702 may include a translucent material. The translucent material may have a color. The translucent material may be transparent. Light may be emitted from LEDs 706 through tube 702. Tube 702 may include any suitable diameter.

Figure 8:
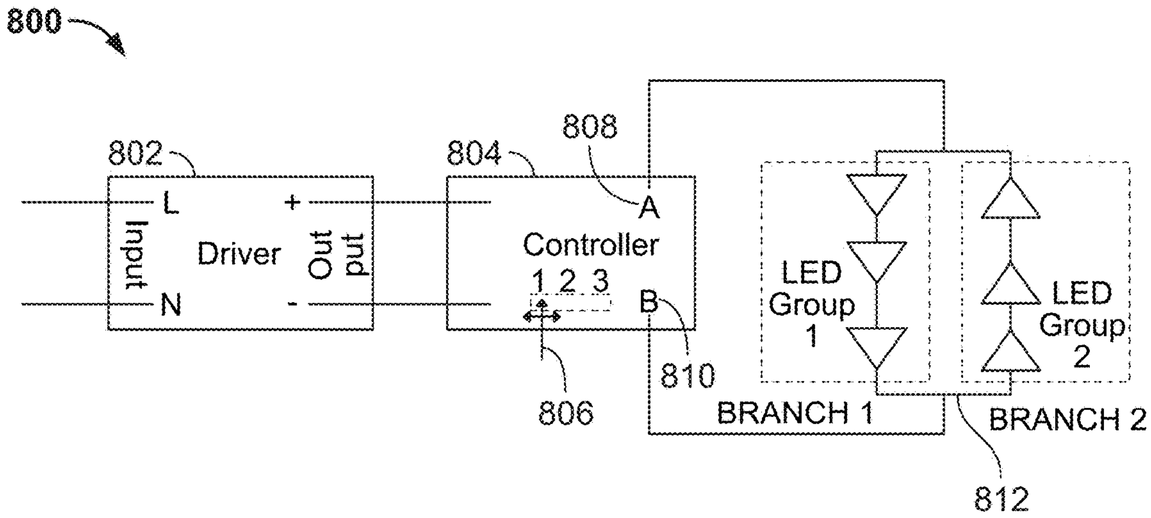
FIG. 8 shows schematically illustrative apparatus in accordance with the principles of the invention.

FIG. 8 shows illustrative architecture 800 for providing mixed CCTs. Architecture 800 may be included in one or more of light tapes 100, 300, 500 and 700. Architecture 800 may include illustrative driver 802. Architecture 800 may include illustrative controller 804. Architecture 800 may include illustrative LED branches 1 and 2. Branch 1 may include first CCT LEDs ("LED group 1"). Branch 2 may include second CCT LEDs ("LED group 2"). The second CCT may be different from the first CCT. The first CCT and the second CCT may include any suitable CCT as listed in Table 1.

Controller 804 may include user-operable CCT selector 806. Selector 806 may have two or more settings, e.g., "1," "2," "3," and any other suitable setting. The different settings may correspond to different outputs at poles 808 ("A") and 810 ("B"). Architecture 800 may include illustrative LED module circuit 812. Selector 806 may be mechanically operable. Selector 806 may be electronically operable. Selector 806 may be operable electronically by software. Selector 806 may be operable remotely from a mobile device. Selector 806 may be operable wirelessly.

When selector 806 is in position "1", controller 804 may control pole A to be the "+" pole and pole B to be the "−" pole. When controller 804 controls pole A to be the "+" pole and pole B to be the "−" pole, LED group 1 may be on, and LED group 2 may be off. At this time, the color temperature of light emitted by LED module circuit 812 may be the LED group 1 color temperature.

When selector 806 is in position "3", controller 804 may control pole A to be the "−" pole and pole B to be the "+" pole. When controller 804 controls pole A to be the "−" pole and pole B to be the "+" pole, LED group 1 may be off, and LED group 2 may be on. At this time, the color temperature of light emitted by LED module circuit 812 may be LED 2 color temperature.

When selector 806 is in position "2", controller 804 may control pole A for a first fraction of the time to be the "+" pole and for a second fraction of the time to be the "−" pole. Pole B may have polarity opposite that of pole A. When the positive and negative switching frequency is large enough, the color temperature of the fixture may be a mixture of the CCTs of LED group 1 and LED group 2. The mixed CCT may be a CCT value in a range listed in Table 1. The mixed CCT may be 3,500° K, for example.

A switching cycle, during which LED group 1 are illuminated for a first fraction and LED group 2 are illuminated for a second fraction, may have any suitable duration.

The first and second fractions may be the same. The first and second fractions may be different. A sum of the first and second fractions may be about 1. The first and second fractions may be sized to result in a desired CCT mix between LED group 1 and LED group 2. The first and second fractions may include fractions as listed in Table 2.

Figure 9:
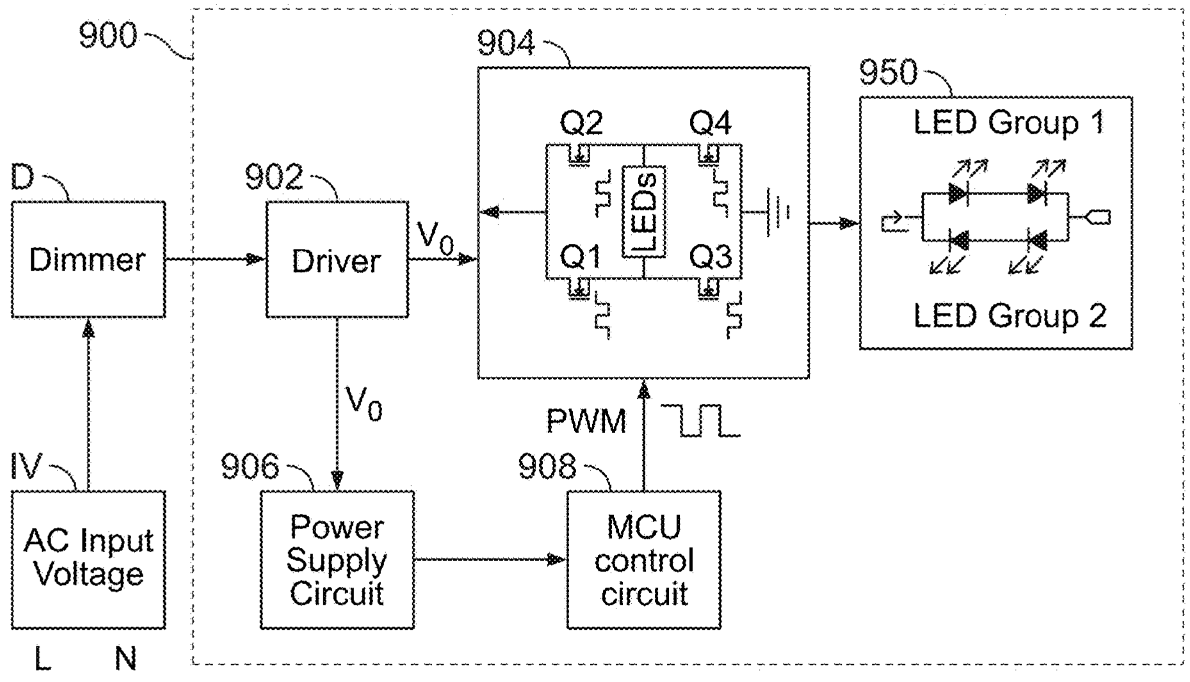
FIG. 9 shows schematically illustrative apparatus in accordance with the principles of the invention.

FIG. 9 shows an illustrative logic diagram of color temperature regulating circuit 900. The color temperature regulating circuit may have one or more features in common with architecture 800. Color temperature regulating circuit 900 may be included in one or more of light tapes 100, 300, 500 and 700.

Circuit 900 may include driver 902. Circuit 900 may include color switching unit 904. Circuit 900 may include power supply circuit 906. Circuit 900 may include MCU control circuit 908.

Circuit 900 may receive a dimming signal from dimmer D. Dimmer D may include any suitable dimmer. Dimmer D may be a commercially available dimmer switch. Dimmer D may include a forward phase cut dimmer (e.g., magnetic low voltage ("MLV") or Triac). Dimmer D may include a reverse phase dimmer (e.g., electronic low voltage ("ELV")). Dimmer D may include a 0-10V dimmer. Dimmer D may be a wall-mounted dimmer switch.

AC power may enter dimmer D from L and N phase lines from standard AC Input Voltage IV.

Driver 902 may be any suitable driver. Table 3 lists illustrative drivers for sections of different lengths. A fixture having one or more sections may have one or more drivers for each section.

TABLE 3

Illustrative drivers (902) for different section lengths.

Illustrative drivers (902) for different chain lengths

| Number of sections (N) | Illustrative driver (902), available from Dongguan AMC Lighting Co., Ltd., Dongguan City, China |
|---|---|
| 6 | 4LD0350U2238CP0350 |
| 8 | 4LD0500U2238DP0500 |
| 14 | 4LD0700U2240DP0700 |
| 18 | 4LD1050U2038AP1050 |
| 22 | 4LD1400U2036AP1400 |
| 40 | 2 * 4LD1050U2038AP1050 |
| Other suitable numbers | Other suitable drivers |

Driver 902 may output voltage $V_o$. $V_o$ may have a variable voltage. $V_o$ may have a constant current. Driver 902 may provide $V_o$ to color switching unit 904. Driver 902 may provide $V_o$ to microcontroller unit ("MCU") control circuit 908. Color switching unit 904 may include LED module circuit 950. MCU control circuit 908 may control the flow of current through LED group 1 and LED group 2 by controlling the states of MOSFETs Q1, Q2, Q3 and Q4 in color switching unit 904.

Power supply circuit 906 may provide a constant voltage to MCU control circuit 908.

Figure 10:
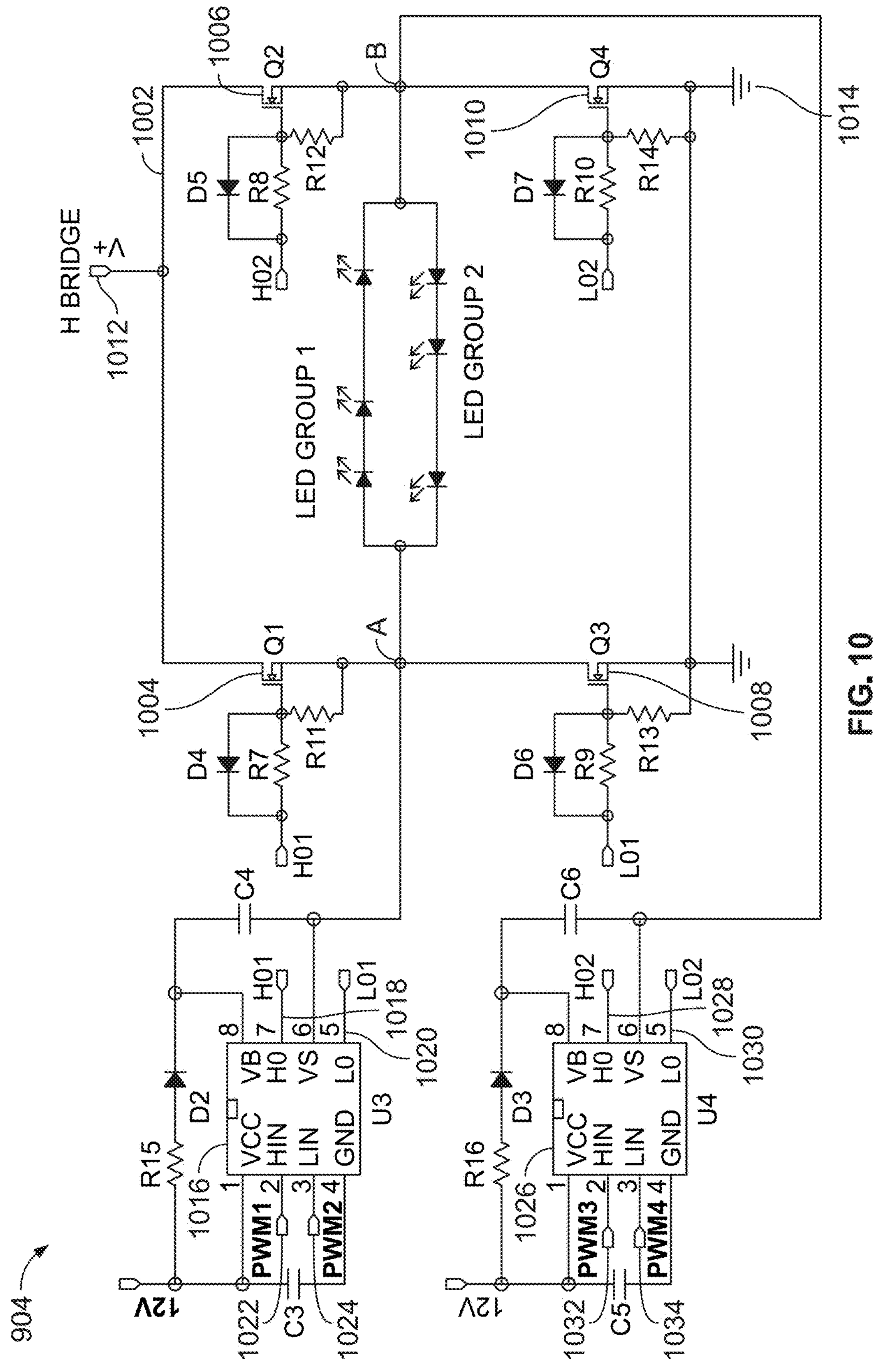
FIG. 10 shows schematically illustrative apparatus in accordance with the principles of the invention.

FIG. 10 shows illustrative color switching unit 904. Color switching unit 904 may include H-bridge 1002. H-bridge 1002 may include MOSFET 1004 (Q1). H-bridge 1002 may include MOSFET 1006 (Q2). H-bridge 1002 may include MOSFET 1008 (Q3). H-bridge 1002 may include MOSFET 1010 (Q4). Voltage 1012 (V+), relative to ground 1014, may be applied to H-bridge 1002. Voltage 1012 (V+) may be received from power supply circuit 906. Voltage 1012 (V+) may power LED group 1 and LED group 2. MOSFETs 1004 (Q1), 1006 (Q2), 1008 (Q3) and 1010 (Q4) may direct lighting power from voltage 1012 (V+).

In a first state, MOSFETs 1004 (Q1) and 1010 (Q4) may be open (conducting) and MOSFETs 1006 (Q2) and 1008 (Q3) may be closed (non-conducting). In the first state, output pole A may be HIGH and output pole B may be LOW. Current may flow through the LED group 1, which are aligned to conduct from output pole A to output pole B when output pole A is HIGH, and not through the LED group 2, which are aligned with polarity opposite LED group 1.

In a second state, MOSFETs 1006 (Q2) and 1008 (Q3) may be open and MOSFETs 1004 (Q1) and 1010 (Q4) may be closed. In the second state, output pole B may be HIGH and output pole A may be LOW. Current may flow through the LED group 2, which are aligned to conduct from output pole B to output pole A when output pole B is HIGH, and not through the LED group 1, which are aligned with polarity opposite the LED group 2.

In a third state, H-bridge 1002 may alternate between the first and second states. The alternation may have a duty cycle. The alternation may be based on fractions of the duty cycle. The first, second and third states may correspond to positions of selector 806 (in FIG. 8).

Color switching unit 904 may include integrated circuit ("IC") 1016 (U3). IC 1016 (U3) may output PWM voltages 1018 (H01) and 1020 (L01), which may control, respectively MOSFETs 1004 (Q1) and 1008 (Q3). IC 1016 (U3) may receive signal 1022 (PWM1) and signal 1024 (PWM2). IC 1016 (U3) may receive signal 1022 (PWM1) at pin HIN. IC 1016 (U3) may receive signal 1024 (PWM2) at pin LIN.

Color switching unit 904 may include integrated circuit ("IC") 1026 (U4). IC 1026 (U4) may output PWM voltages 1028 (H02) and 1030 (L02), which may control, respectively MOSFETs 1006 (Q2) and 1010 (Q4). IC 1026 (U4) may receive signal 1032 (PWM3) and signal 1034 (PWM4). IC 1016 (U3) may receive signal 1032 (PWM3) at pin HIN. IC 1016 (U3) may receive signal 1034 (PWM4) at pin LIN.

The sum of signals 1022 (PWM1), 1024 (PWM2), 1032 (PWM3) and 1034 (PWM4) may correspond to a dimming level set by dimmer D. The difference of signals 1022 (PWM1) and 1024 (PWM2) may correspond to a difference in intensity of light emission from LED group 1 and LED group 2. The difference of signals 1032 (PWM3) and 1034 (PWM4) may correspond to a difference in intensity of light emission from LED group 1 and LED group 2. The difference may be based on an OFF condition in one of LED group 1 and LED group 2. The difference may be based on a difference of ON conditions between LED group 1 and LED group 2.

IC 1016 (U3) and IC 1026 (U4) may have similar or identical pin configurations. The inputs of signals 1022 (PWM1) and 1024 (PWM2) to IC 1026 (U4) pins HIN and LIN may be the reverse of the inputs of signals 1032 (PWM3) and 1034 (PWM4) to IC 1016 (U3) pins HIN and LIN. Current flow may be apportioned between LED group 1 and LED group 2.

Input of signals 1022 (PWM1) and 1024 (PWM2) to IC 1026 (U4) and input of signals 1032 (PWM3) and 1034 (PWM4) to IC 1016 (U3) may enable individual control of H-bridge 1002. Signals 1022 (PWM1) and 1024 (PWM2) may be used to control MOSFET 1004 (Q1) and MOSTFET 1008 (Q3). Signals 1032 (PWM3) and 1034 (PWM4) may be used to control MOSFET 1006 (Q2) and MOSFET 1010 (Q4). Receiving four PWM signals may improve color temperature accuracy when LEDs included in LED group 1 and LED group 2 are dimmed to a low level.

Figure 11:
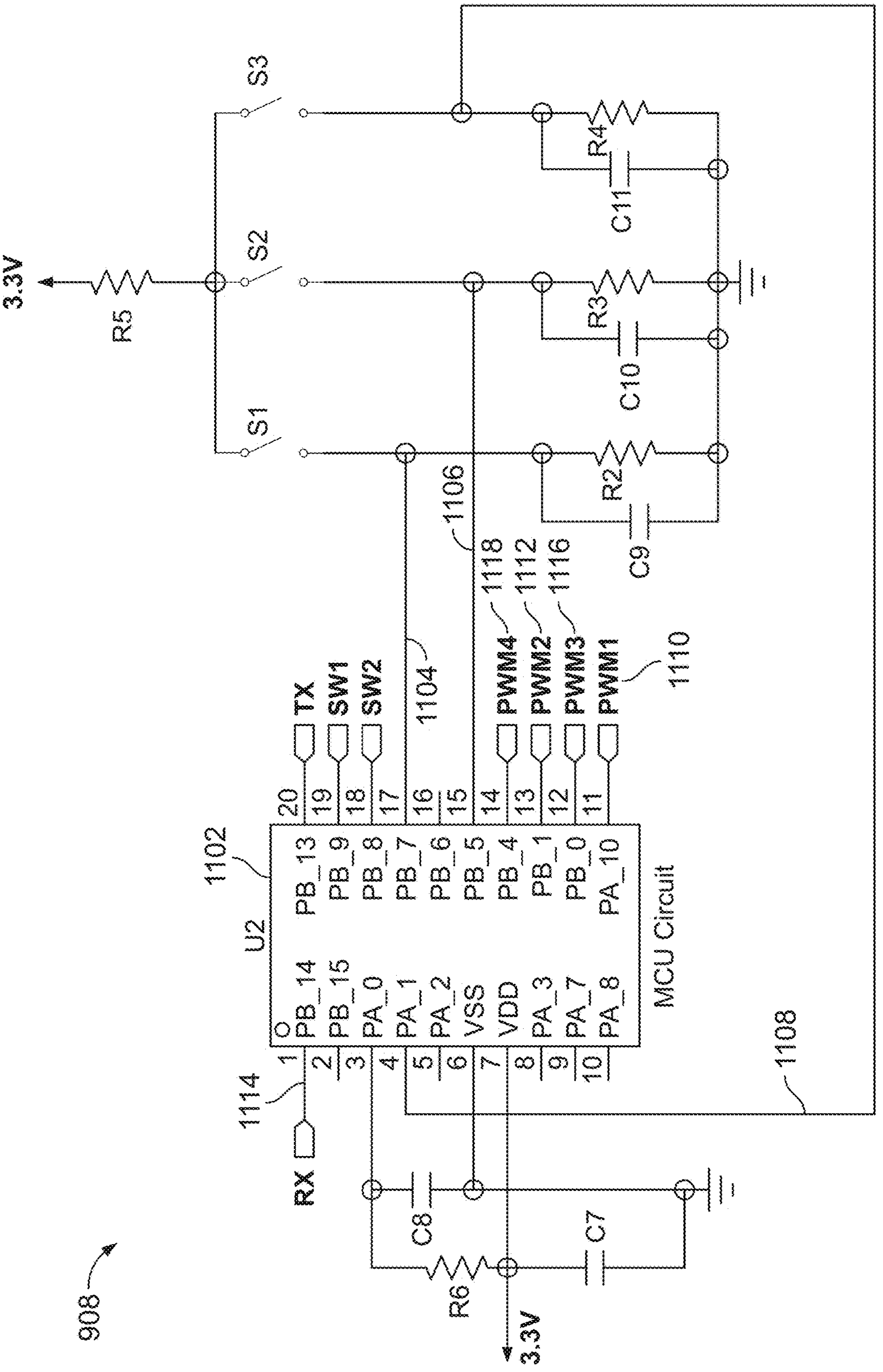
FIG. 11 shows schematically illustrative apparatus in accordance with the principles of the invention.

FIG. 11 shows illustrative MCU control circuit 908. MCU control circuit 908 may include MCU 1102 (U2). MCU 1102 (U2) may receive switch inputs 1104, 1106 and 1108, which may correspond to positions 1, 2 and 3 of selector 806. When selector 806 is at position 1, MCU 1102 (U2) may output a high duty cycle PWM signal at pin 1110 (PA_10; PWM1) and pin 1118 (PB_4; PWM4). When selector 806 is at position 1, MCU 1102 (U2) may output a low duty cycle PWM signal at pin 1112 (PB_1; PWM2) and at pin 1116 (PB_0; PWM3). The low duty cycle PWM signal may correspond to an OFF condition in LED group 2.

When selector 806 is at position 2, MCU 1102 (U2) may output a low duty cycle PWM signal at pin 1110 (PA_10; PWM1) and pin 1118 (PB_4; PWM4). When selector 806 is at position 2, MCU 1102 (U2) may output a high duty cycle PWM signal at pin 1112 (PB_1; PWM2) and at pin 1116 (PB_0; PWM3). The low duty cycle PWM signal may correspond to an OFF condition in LED group 1.

When selector 806 is at position 3, MCU 1102 (U2) may switch the high and low duty cycles between pins 1110 (PA_10; PWM1), 1112 (PB_1; PWM2), 1116 (PB_0; PWM3) and 1118 (PB_4; PWM4). The switch may be performed repeatedly at the switching cycle. This may cause alternating illumination between LED group 1 and LED group 2. The alternating illumination may provide illumination having a CCT that is a mixture of the first and second CCT.

MCU control circuit 908 may receive external control signal 1114 (Rx). Signal 1114 (Rx) may be processed by the MCU 1102 (U2) to obtain signals 1022 (PWM1), 1024 (PWM2), 1032 (PWM3) and 1034 (PWM4).

By controlling the turn-on time of the MOSFETs 1004 (Q1)/1010 (Q4) and 1006 (Q2)/1008 (Q3), the brightness of the LED light sources included in LED group 1 and LED group 2 may be adjusted, so as to realize the adjustment of the CCT of LED light source.

Figure 12:
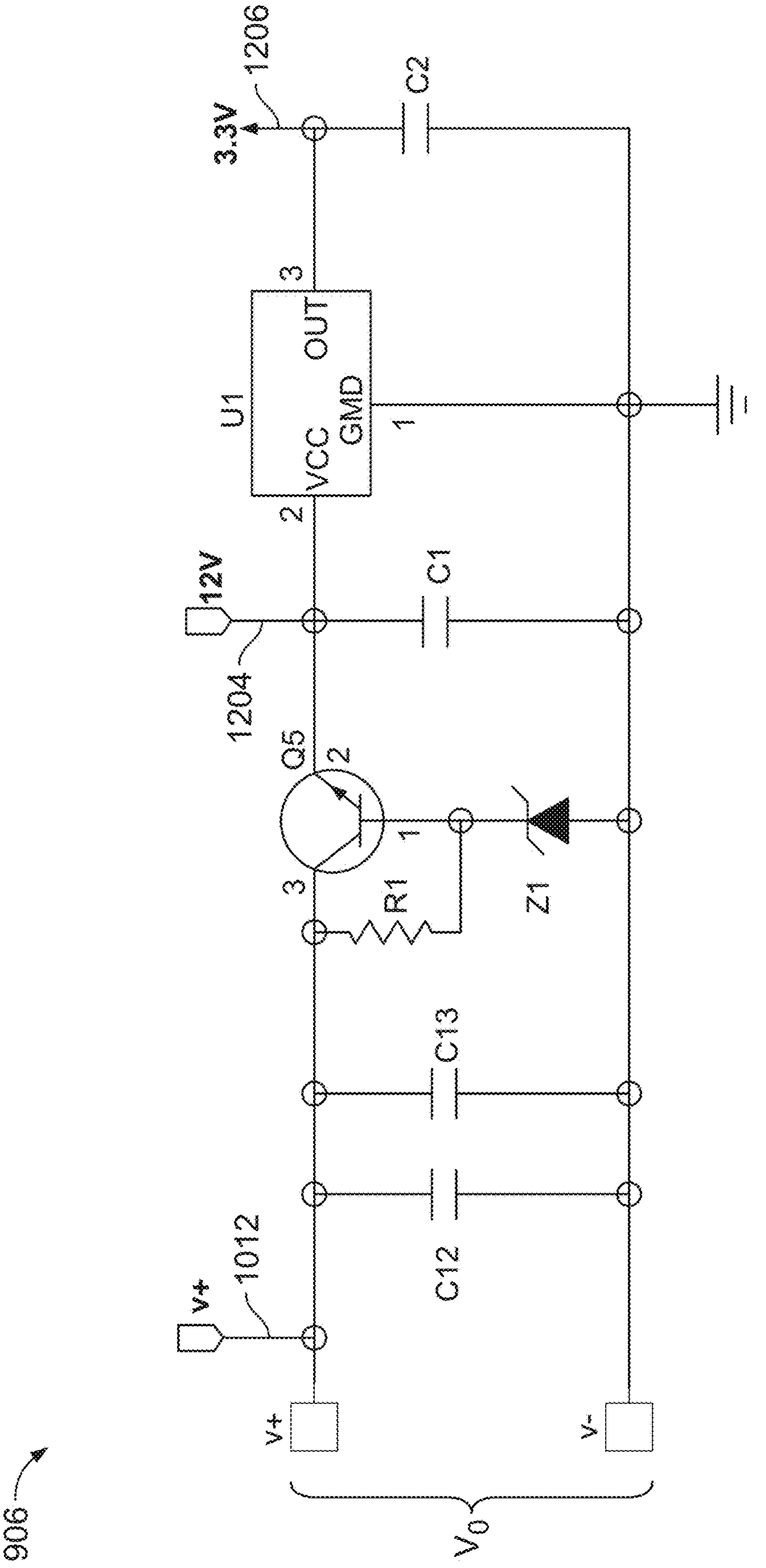
FIG. 12 shows schematically illustrative apparatus in accordance with the principles of the invention.

FIG. 12 shows illustrative power supply circuit 906. Power supply circuit 906 may receive voltage $V_o$. Power supply circuit 906 may provide voltage 1012 (V+), which may be used by color switching unit 904 to power LED group 1 and LED group 2. Power supply circuit 906 may provide voltage 1204 (12V), which may provide operational voltage for ICs 1016 (U3) and 1026 (U4). Power supply circuit 906 may provide constant voltage 1206 (5V), which may provide operational voltage for MCU 1102 (U2).

Figure 13:
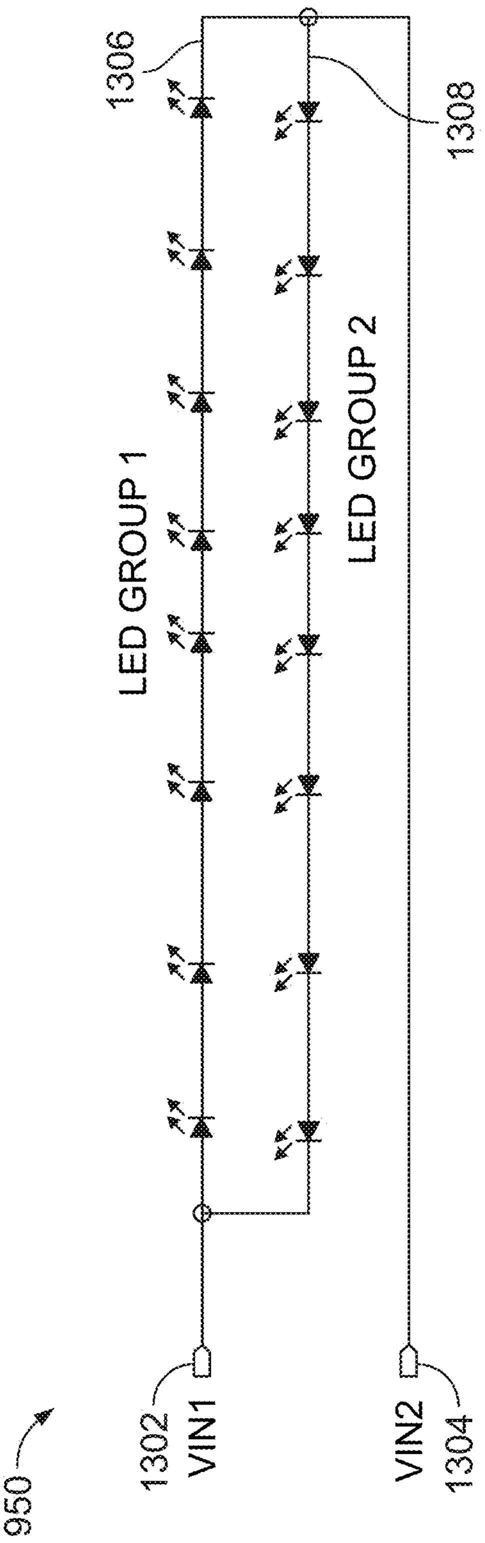
FIG. 13 shows schematically illustrative apparatus in accordance with the principles of the invention.

FIG. 13 shows illustrative LED module circuit 950. Circuit 950 may be implemented on a PCB in a light tape segment, such as light tape segment 102 and light tape segment 104 (shown in FIG. 1).

LED module circuit 950 may include branch 1306. Branch 1306 may include one or more warm CCT LEDs. The warm CCT LEDs may correspond to LED Group 1 (shown in FIG. 8). Branch 1306 may receive voltage via input 1302 (VIN1) and input 1304 (VIN2). Input 1302 (VIN1) may correspond to pole A (shown in FIG. 8). Input 1304 (VIN2) may correspond to pole B (shown in FIG. 8).

LED module circuit 950 may include branch 1308. Branch 1308 may include one or more cool CCT LEDs. The cool CCT LEDs may correspond to LED Group 2. Branch 1308 may receive voltage via input 1302 (VIN1) and input 1304 (VIN2). Input 1302 (VIN1) may correspond to pole A (shown in FIG. 8). Input 1304 (VIN2) may correspond to pole B (shown in FIG. 8).

Table 4 lists illustrative parts that may be associated with one or more circuits.

TABLE 4

| Illustrative parts that may be associated with one or more circuits. | |
|---|---|
| **Illustrative Part** | **Tag** |
| Double-sided FR4 52*26*1.2 mm 2*5 continuous piece | |
| X7R SMD capacitors 2.2 uF/100 V, ± 10%, 125° C.(1206) | C13, C12 |
| Ultra-fast recovery diodes ES1JW 1A/600 V SOD-123FL | D2, D3 |
| SMD switching diodes 1N4148W, 0.15 A/75 V, SOD-123 | D4, D5, D6, D7 |
| SMD regulator diodes 12 V ± 2%/MM1ZB12 0.5 W SOD-123 | Z1 |
| X7R SMD capacitors 1uF/50 V, ± 10%, 125° C.(0805) | C1, C3, C5, C7 |
| X7R SMD capacitors 1nF/50 V, ± 10%, 125° C.(0805) | C9, C10, C11 |
| X7R SMD capacitors 100nF/50 V, ± 10%, 125° C.(0805) | C4, C6 |
| X7R SMD capacitors 100nF/50 V, ± 10%, 125° C.(0603) | C8 |
| 1/8 W chip resistor 20K ± 1%(0805) | R1, R2, R3, R4 |
| 1/8 W SMD resistors 3.3R ± 1%(0805) | R5, R6 |
| 1/8 W chip resistor, 47KΩ ± 1% (0805). | R11, R12, R13, R14 |
| 1/8 W SMD resistors 5.1Ω ± 1%(0805) | R7, R8, R9, R10 |
| 1/8 W SMD resistors 1K ± 1%(0805) | R16 |
| 1/10 W SMD resistors 1K ± 1%(0603) | R15 |
| SMD voltage stabilizing IC LD1117A,3.3V,SOT-89 | U1 |
| SMD IC ME32S003AF6P7 SS0P-20 panel mounted RoHS | U2 |
| SMD IC ID2006 SOIC8 RoHS | U3, U4 |
| SMD N-MOSFET 15N10,TO-252 | Q1, Q2, Q3, Q4 |
| SMD NPN transistor 2SD1760U_SOT-89_60 V/3A | Q5 |
| SMD TVS tubes 60 V/600 W(SMB) SMBJ60A | TV1 |
| 18# blue Teflon wire length 200 full peel 11 immersed in tin 3 | |
| 18# brown Teflon wire length 200 full peel 11 immersed in tin 3 | |
| 18# red Teflon wire is 200 long, half stripped 13/immersed in tin 3 | |
| 18# black Teflon wire length 200, half stripped 13/immersed in tin 3 | |
| Three-position toggle switch ZYC-2301G2 BK | |
| Other illustrative parts | |

Figure 14:
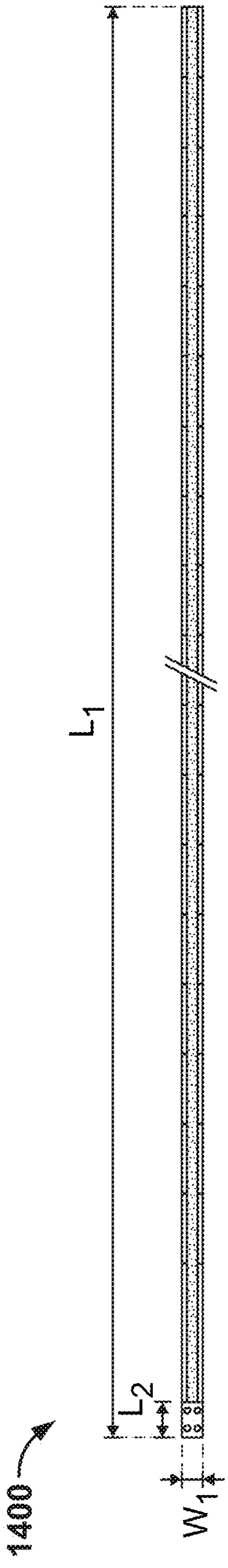
FIG. 14 shows schematically illustrative apparatus in accordance with the principles of the invention.

FIG. 14 shows illustrative light tape segment 1400. Light tape segment 1400 may include one or more features in common with one or more of light tape 100, 300, 500 and 700.

Light tape segment 1400 may include dimensions. Table 5 lists the dimensions and corresponding ranges.

TABLE 5

| Illustrative dimensions and corresponding ranges. | | | |
|---|---|---|---|
| Illustrative dimensions | | | |
| Dimension | Lower limit (cm) | Upper limit (cm) | Example (cm) |
| $L_1$ | <0.1 | >1000 | 500 |
| $L_2$ | <0.1 | >20 | 5 |
| $W_1$ | <0.1 | >20 | 3 |
| Other suitable dimension | Other suitable ranges | | Other suitable examples |

Figure 15:
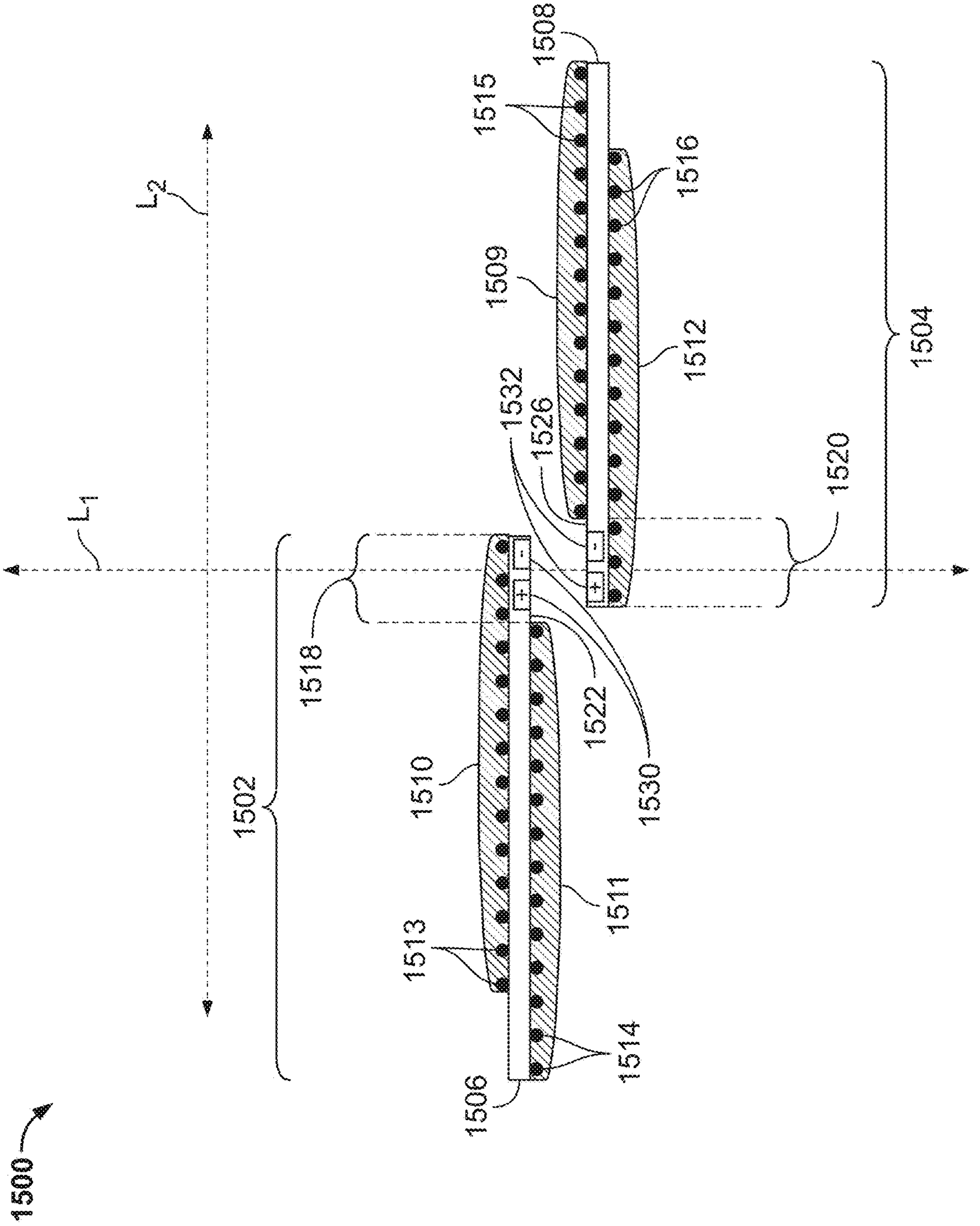
FIG. 15 shows schematically illustrative apparatus in accordance with the principles of the invention.

FIG. 15 shows illustrative light tape 1500. Light tape 1500 may include one or more features in common with one or more of light tape 100, 300, 500 and 700.

Light tape 1500 may include segment 1502. Segment 1502 may include PCB 1506. LEDs 1513 may be disposed on a first side of PCB 1506. LEDs 1514 may be disposed on a second side of PCB 1506. Extension 1518 may extend from PCB 1506. Cover 1510 may cover a first side of PCB 1506 and extension 1518. Cover 1511 may cover a second side of PCB 1506. Cover 1511 may not cover extension 1518. Extension 1518 may include surface 1522. Surface 1522 may include electrical contacts 1530.

Light tape 1500 may include segment 1504. Segment 1504 may include PCB 1508. LEDs 1515 may be disposed on a first side of PCB 1508. LEDs 1516 may be disposed on a second side of PCB 1508. Extension 1520 may extend from PCB 1508. Cover 1512 may cover a first side of PCB 1508 and extension 1520. Cover 1509 may cover a second side of PCB 1508. Cover 1509 may not cover extension 1520. Extension 1520 may include surface 1526. Surface 1526 may include electrical contacts 1532.

Segment 1502 may extend along axis $L_2$. Segment 1504 may extend along axis $L_2$. Segment 1502 may connect to segment 1504. When segment 1502 is connected to segment 1504, surface 1522 may be in contact with surface 1526. When surface 1522 is in contact with surface 1526, electrical contacts 1530 may be in contact with electrical contacts 1532. When electrical contacts 1530 are in contact with electrical contacts 1532, electricity may be conducted from segment 1502 to segment 1504. Electricity may be conducted from segment 1502 to segment 1504 along axis $L_1$.

Functions of electrical circuits, or parts thereof, disclosed herein may be incorporated into or combined with other electrical circuits, or parts thereof, disclosed herein, or with other suitable electrical circuits.

All ranges and parameters disclosed herein shall be understood to encompass any and all subranges subsumed therein, every number between the endpoints, and the endpoints. For example, a stated range of "1 to 10" should be considered to include any and all subranges between (and inclusive of) the minimum value of 1 and the maximum value of 10; that is, all subranges beginning with a minimum value of 1 or more (e.g. 1 to 6.1), and ending with a maximum value of 10 or less (e.g., 2.3 to 9.4, 3 to 8, 4 to 7), and finally to each number 1, 2, 3, 4, 5, 6, 7, 8, 9, and 10 contained within the range.

Thus, apparatus, methods and systems for lighting control have been provided. Persons skilled in the art will appreciate that the present invention may be practiced by other than the described embodiments, which are presented for purposes of illustration rather than of limitation.

What is claimed is:

1. A light tape comprising:

a first segment;

a first array of light emitting diodes ("LEDs") disposed along the first segment, the first array of LEDs configured to emit light in a first direction;

a second array of LEDs disposed along the first segment, the second array of LEDs configured to emit light in a second direction; and a first extension extending from the first segment;

wherein:

the first extension is configured to be physically connected to a second extension extending from a second segment, the first extension forming a joint when connected to the second extension, the joint including:

an electrical connection that is not configured to fasten the first extension to the second extension; and a mechanical connection that is not configured to conduct electricity from the first extension to the second extension; and the joint is configured to include at least one LED disposed on each of the first extension and the second extension.

2. The light tape of claim 1 wherein the first direction is opposite the second direction.

3. The light tape of claim 1 wherein the first extension is configured to be connected to the second extension via a weld.

4. The light tape of claim 1 wherein the first extension is configured to be connected to the second extension via a magnet.

5. The light tape of claim 1 wherein the first extension is configured to be connected to the second extension via an adhesive.

6. The light tape of claim 1 wherein the first extension is configured to be electrically connected to the second extension via:

first electrical contacts disposed on the first extension; and second electrical contacts disposed on the second extension.

7. The light tape of claim 6 wherein:

the first electrical contacts do not extend beyond the first extension; and the second electrical contacts do not extend beyond the second extension.

8. The light tape of claim 1 wherein:

the first segment includes a printed circuit board ("PCB");

the first array of LEDs is configured to be disposed on a first side of the PCB;

the second array of LEDs is configured to be disposed on a second side of the PCB; and the first side of the PCB is opposite the second side of the PCB.

9. The light tape of claim 1 wherein:

the first segment includes a first printed circuit board ("PCB") and a second PCB;

the first array of LEDs is configured to be disposed on the first PCB;

the second array of LEDs is configured to be disposed on the second PCB; and the first PCB is configured to be disposed opposite the second PCB.

10. The light tape of claim 1 wherein:

the first array of LEDs and the second array of LEDs include first correlated color temperature ("CCT") LEDs and second CCT LEDs; and the first segment:

further includes:

a first output pole; and a second output pole; and is in electronic communication with:

a selector configured to select from a plurality of CCT states a mixed CCT; and a controller circuit configured to:

for a first fraction of time, apply to the first output pole and the second output pole a voltage having a first polarity; and, for a second fraction of time, apply to the first output pole and the second output pole a voltage having a second polarity that is opposite the first polarity;

wherein the first fraction of time corresponds to the mixed CCT.

11. The light tape of claim 10 wherein the first segment is further configured to:

receive input voltage via a first wire and a second wire; and apply voltage to the first output pole and the second output pole via the first wire and the second wire.

12. The light tape of claim 1 further including:

a first cover configured to cover the first array of LEDs; and a second cover configured to cover the second array of LEDs;

wherein the first cover and the second cover include a translucent material.

13. The light tape of claim 1 wherein:

LEDs included in the first array of LEDs and the second array of LEDs are each configured to be spaced in a pattern; and the at least one LED on each of the first extension and the second extension are spaced along the pattern.

14. The light tape of claim 13 wherein the pattern is a repetitive spacing pattern.

15. A light tape segment comprising:

a first side and a second side, the second side opposite the first side;

a first extension and a second extension;

a first array of light emitting diodes ("LEDs") disposed along the first side, the first array of LEDs configured to emit light in a first direction; and a second array of LEDs disposed along the second side, the second array of LEDs configured to emit light in a second direction;

wherein:

the first array of LEDs are disposed on the first extension and the second array of LEDs are not disposed on the first extension;

the second array of LEDs are disposed on the second extension and the first array of LEDs are not disposed on the second extension;

the first extension is configured to connect to a third extension extending from a second light tape segment forming a first joint; and the second extension is configured to connect to a fourth extension extending from a third light tape segment forming a second joint;

wherein:

the first extension is configured to be electrically connected to the third extension with an electrical connection that is not configured to fasten the first extension to the third extension;

the first extension is configured to be mechanically connected to the third extension with a mechanical connection that is not configured to conduct electricity from the first extension to the third extension;

the second extension is configured to be electrically connected to the fourth extension with an electrical connection that is not configured to fasten the second extension to the fourth extension; and the second extension is configured to be mechanically connected to the fourth extension with a mechanical connection that is not configured to conduct electricity from the second extension to the fourth extension.

16. The light tape segment of claim 15 wherein the first direction is opposite the second direction.

17. The light tape segment of claim 15 wherein:

the first extension is connected to the third extension via a first weld; and the second extension is connected to the fourth extension via a second weld.

18. The light tape segment of claim 15 wherein:

the first extension is connected to the third extension via a first magnet; and the second extension is connected to the fourth extension via a second magnet.

19. The light tape segment of claim 15 wherein:

the first extension is connected to the third extension via a first adhesive; and the second extension is connected to the fourth extension via a second adhesive.

20. The light tape segment of claim 15 wherein:

the first extension includes first electrical contacts configured to electrically connect to third electrical contacts included in the third extension; and the second extension includes second electrical contacts configured to electrically connect to fourth electrical contacts included in the fourth extension.

21. The light tape segment of claim 20 wherein:

the first electrical contacts are configured to not extend beyond a first face defined by the first extension;

the second electrical contacts are configured to not extend beyond a second face defined by the second extension;

the third electrical contacts are configured to not extend beyond a third face defined by the third extension; and the fourth electrical contacts are configured to not extend beyond a fourth face defined by the fourth extension.

22. The light tape segment of claim 15 further including a printed circuit board ("PCB"), wherein:

the first array of LEDs is configured to be disposed on a first side of the PCB;

the second array of LEDs is configured to be disposed on a second side of the PCB; and the first side of the PCB is opposite the second side of the PCB.

23. The light tape segment of claim 15 further including a first printed circuit board ("PCB") and a second PCB, wherein:

the first array of LEDs is configured to be disposed on the first PCB;

the second array of LEDs is configured to be disposed on the second PCB; and the first PCB is configured to be disposed opposite the second PCB.

24. The light tape segment of claim 15 wherein:

the first array of LEDs and the second array of LEDs include first correlated color temperature ("CCT") LEDs and second CCT LEDs;

the first extension further includes:

a first output pole; and a second output pole; and the light tape segment further includes:

a selector configured to select from a plurality of CCT states a mixed CCT; and a controller circuit configured to:

for a first fraction of time, apply to the first output pole and the second output pole a voltage having a first polarity; and, for a second fraction of time, apply to the first output pole and the second output pole a voltage having a second polarity that is opposite the first polarity;

wherein the first fraction of time corresponds to the mixed CCT.

25. The light tape segment of claim 24 wherein the light tape segment is further configured to:

receive input voltage via a first wire and a second wire; and apply voltage to the first output pole and the second output pole via the first wire and the second wire.

26. The light tape segment of claim 15 further including:

a first cover configured to cover the first side and the first extension; and a second cover configured to cover the second side and the second extension;

wherein the first cover and the second cover include a translucent material.

27. The light tape segment of claim 15 wherein the first array of LEDs and the second array of LEDs are each configured to be spaced in a pattern.

28. The light tape segment of claim 27 wherein the pattern is a repetitive spaced pattern.

* * * * *